US012291811B2

(12) United States Patent
Tincher et al.

(10) Patent No.: US 12,291,811 B2
(45) Date of Patent: May 6, 2025

(54) PRESSURE COMPENSATED VENTURI DISPENSING SYSTEM

(71) Applicant: Delaware Capital Formation, Inc., Wilmington, DE (US)

(72) Inventors: Terry Tincher, Lebanon, OH (US); Christopher J. Dyer, South Warnborough (GB)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 18/394,014

(22) Filed: Dec. 22, 2023

(65) Prior Publication Data

US 2024/0200255 A1  Jun. 20, 2024

Related U.S. Application Data

(63) Continuation of application No. 17/086,505, filed on Nov. 2, 2020, now Pat. No. 11,891,741, which is a
(Continued)

(51) Int. Cl.
*D06F 33/37* (2020.01)
*B01F 25/312* (2022.01)
(Continued)

(52) U.S. Cl.
CPC ........ *D06F 33/37* (2020.02); *B01F 25/31232* (2022.01); *B01F 25/31243* (2022.01);
(Continued)

(58) Field of Classification Search
None
See application file for complete search history.

(56) References Cited

U.S. PATENT DOCUMENTS 3,120,326 A   2/1964  Hedeman
5,259,557 A   11/1993 Spriggs et al.
(Continued)

FOREIGN PATENT DOCUMENTS

CN   104170811     12/2014
EP   2188689 B1    6/2013
(Continued)

OTHER PUBLICATIONS

U.S. Appl. No. 15/689,255, filed Aug. 29, 2017, Tincher.
(Continued)

*Primary Examiner* — Carlos R Ortiz Rodriguez
(74) *Attorney, Agent, or Firm* — Fish & Richardson P.C.

(57) ABSTRACT

Systems, methods, and software program products for dispensing chemical solutions. A controller receives a signal from a pressure sensor indicative of a pressure of a diluent. The controller determines an expected flow rate of the diluent through an eductor based at least in part on the pressure of the diluent. The controller may further determine an expected concentration of a chemical product in the solution dispensed from a discharge port of the eductor. Based on the expected flow rated and concentration of the chemical product, the controller determines a duration of a dispense stage of a dispensing operation required to dispense a predetermined dose of the chemical product. The controller then causes the diluent to flow through the eductor for the determined duration of the dispense stage. A check valve on the output of the eductor prevents dissimilar chemicals from mixing and reduces a response time of the eductor.

23 Claims, 16 Drawing Sheets

Related U.S. Application Data continuation of application No. 16/026,746, filed on Jul. 3, 2018, now Pat. No. 10,877,491.

(60) Provisional application No. 62/558,499, filed on Sep. 14, 2017.

(51) Int. Cl.
| | |
|---|---|
| *B01F 35/21* | (2022.01) |
| *G05D 7/06* | (2006.01) |
| *G05D 11/00* | (2006.01) |
| *G05D 11/08* | (2006.01) |
| *G05D 11/13* | (2006.01) |
| *G05D 21/02* | (2006.01) |
| *D06F 103/22* | (2020.01) |
| *D06F 105/42* | (2020.01) |
| *G01N 21/41* | (2006.01) |

(52) U.S. Cl.
CPC ........ *B01F 35/2113* (2022.01); *G05D 7/0617* (2013.01); *G05D 11/00* (2013.01); *G05D 11/08* (2013.01); *G05D 11/138* (2013.01); *G05D 21/02* (2013.01); *D06F 2103/22* (2020.02); *D06F 2105/42* (2020.02); *G01N 21/4133* (2013.01)

(56) References Cited

U.S. PATENT DOCUMENTS

| | | | |
|---|---|---|---|
| 6,571,824 B2 | 6/2003 | Jones et al. | |
| 6,634,376 B2 | 10/2003 | Haas | |
| 7,487,795 B2 | 2/2009 | Sand | |
| 8,813,789 B2 | 8/2014 | Dalhart, Sr. | |
| 8,926,834 B2 | 1/2015 | West et al. | |
| 8,956,579 B2 | 2/2015 | Yankee et al. | |
| 9,447,536 B2 | 9/2016 | Tincher et al. | |
| 10,877,491 B2 | 12/2020 | Tincher et al. | |
| 11,891,741 B2 | 2/2024 | Tincher et al. | |
| 2003/0034078 A1 | 2/2003 | Haas | |
| 2009/0065065 A1 | 3/2009 | Sand | |
| 2010/0024896 A1 | 2/2010 | Dalhart | |
| 2010/0024916 A1 | 2/2010 | Dyer | |
| 2010/0224264 A1 | 9/2010 | Homan et al. | |
| 2013/0200097 A1 | 8/2013 | Yang | |
| 2018/0080952 A1 | 3/2018 | Lehtonen et al. | |
| 2019/0079543 A1 | 3/2019 | Tincher et al. | |
| 2021/0132635 A1 | 5/2021 | Tincher et al. | |

FOREIGN PATENT DOCUMENTS

| | | |
|---|---|---|
| WO | WO 200185320 | 11/2001 |
| WO | WO 2007034304 | 3/2007 |
| WO | WO 2010110796 | 9/2010 |
| WO | WO 2014078750 | 5/2014 |

OTHER PUBLICATIONS

Hydro User Manual FM-800 Flush Manifold, HYD10098686, Rev A May 2017 (Year: 2017).

HydroChem 919 "Multifunction Proportioning and Dispensing System", Rev B Jan. 2006 (Year: 2006).

Search Report in European Appln. No. 18193882.0, dated Mar. 6, 2019.

Extended European Search Report in European Appln. No. 21215202.3, mailed Feb. 18, 2025, 10 pages.

PRESSURE COMPENSATED VENTURI DISPENSING SYSTEM

CROSS REFERENCE TO RELATED APPLICATIONS

This application is a continuation of U.S. application Ser. No. 17/086,505 filed Nov. 2, 2020, which is a continuation of U.S. application Ser. No. 16/026,746 filed Jul. 3, 2018, now U.S. Pat. No. 10,877,491, which claims the benefit of U.S. Application Ser. No. 62/558,499 filed Sep. 14, 2017, the disclosures of which are incorporated by reference herein in their entirety.

BACKGROUND

The present invention generally relates to dispensing systems, and in particular, to systems, methods, and computer program products for dispensing chemical solutions using an eductor based chemical dispenser.

Eductors are devices that pass a liquid through a choke to generate the Venturi effect. The suction generated by the Venturi effect is used to draw another liquid into the eductor. For example, water running through the eductor may cause a chemical product to be drawn into the eductor, where it mixes with the water and is subsequently discharged as a dilute solution. Eductors are often used to mix chemical products with water in dispensing systems to produce small batches of chemical solutions. These batches of chemical solutions may be discharged into a container for later use, a washing machine, or some other apparatus or process that requires dilute chemical solutions.

One problem with dispensing systems that use eductors is that the pressure of the diluent used to feed the eductors must be above a minimum level to produce adequate suction on the chemical inlet side of the eductor. If the pressure falls below the minimum level, the amount of chemical product drawn into the eductor may be insufficient for the resulting solution to perform properly. Moreover, the concentration of the chemical product in the chemical solution discharged from the eductor can vary with the pressure of the diluent across a wide range of operating pressures. This can lead to solutions being specified at higher concentrations than needed to ensure that acceptable levels of chemicals are in the solution when the diluent pressure is at the low end of the operating range of pressures. Another problem with dispensing systems that use eductors is that the internal channels of the eductor can become clogged, which can also affect the concentration of chemicals in the chemical solution discharged by the eductor.

Therefore, there is a need for improved systems, methods, and computer program products for dispensing chemical solutions using eductors that provide solutions with more consistent concentrations.

SUMMARY

In an embodiment of the invention, a dispensing system is provided. The system includes a controller configured to perform a dispensing operation, an eductor, and a pressure sensor. The dispensing operation includes a dispense stage having a duration. The eductor includes an inlet port that is selectively fluidically coupled to a source of a diluent by the controller during the dispense stage, and a discharge port configured to discharge a chemical solution during the dispense stage. The pressure sensor is configured to provide a first signal indicative of a pressure of the diluent to the controller, and the controller determines the duration of the dispense stage based at least in part on the pressure of the diluent.

In another aspect of the dispensing system, the system further includes a concentration sensor configured to provide a second signal to the controller indicative of a characteristic of the diluent or the chemical solution, and the controller determines the duration of the dispense stage based at least in part on the characteristic.

In another aspect of the dispensing system, the characteristic is a concentration of a substance in the diluent or the chemical solution.

In another aspect of the dispensing system, the substance is a mineral and the duration of the dispense stage is proportional to the concentration of the substance.

In another aspect of the dispensing system, the substance is a chemical product, and the duration of the dispense stage is inversely proportional to the concentration of the substance.

In another aspect of the dispensing system, the controller is further configured to capture a sequence of readings indicative of the characteristic, compare the sequence of readings to a predetermined pattern associated with the dispensing operation, and if the sequence of readings is not in accordance with the predetermined pattern, determine there is a problem with the dispensing operation.

In another aspect of the dispensing system, the dispensing operation includes a flush stage, and the controller is further configured to determine the duration of the flush stage based at least in part on the pressure of the diluent.

In another aspect of the dispensing system, the dispensing operation is defined by a dose of the chemical product and a total volume of solution to be dispensed, and the controller is further configured to determine a flow rate of the diluent through the eductor based at least in part on the pressure of the diluent, determine a concentration of the chemical product in the solution discharged by the eductor based at least in part on the pressure of the diluent, and determine the duration of the dispense stage based at least in part on the dose of the chemical product, the concentration of the chemical product in the chemical solution discharged by the eductor, and the flow rate of the diluent through the eductor.

In another aspect of the dispensing system, the controller is further configured to determine a volume of the chemical solution discharged by the eductor during the dispense stage based at least in part on the duration of the dispense stage and the flow rate of the diluent, and determine the duration of the flush stage based at least in part on a difference between the volume of the chemical solution discharged during the dispense stage and the total volume of solution to be dispensed.

In another embodiment of the invention, a method of dispensing a solution is provided. The method comprises receiving the first signal indicative of the pressure of the diluent, determining the duration of the dispense stage of the dispensing operation based at least in part on the pressure of the diluent, and causing the diluent to flow through the eductor for the determined duration of the dispense stage.

In another aspect of the method, the method further includes receiving the second signal indicative of the characteristic of the diluent or the chemical solution discharged from the discharge port of the eductor, and determining the duration of the dispense stage based at least in part on the characteristic.

In another aspect of the method, the characteristic is the concentration of the substance in the diluent or chemical solution.

In another aspect of the method, the substance is the mineral, and the duration of the dispense stage is proportional to the concentration of the substance.

In another aspect of the method, the substance is the chemical product, and the duration of the dispense stage is inversely proportional to the concentration of the substance.

In another aspect of the method, the method further includes capturing the sequence of readings indicative of the characteristic during the dispensing operation, comparing the sequence of readings to the predetermined pattern associated with the dispensing operation, and if the sequence of readings is not in accordance with the predetermined pattern, determining there is a problem with the dispensing operation.

In another aspect of the method, the dispensing operation includes the flush stage, and the method further comprises determining the duration of the flush stage based at least in part on the pressure of the diluent.

In another aspect of the invention, the dispensing operation is defined by the dose of the chemical product and the total volume of solution to be dispensed, and the method further comprises determining the flow rate of the diluent through the eductor based at least in part on the pressure of the diluent, determining the concentration of the chemical product in the solution discharged by the eductor based at least in part on the pressure of the diluent, and determining the duration of the dispense stage based at least in part on the dose of the chemical product, the concentration of the chemical product in the solution discharged by the eductor, and the flow rate of the diluent through the eductor.

In another aspect of the invention, the method further comprises determining the volume of the solution discharged by the eductor during the dispense stage based at least in part on the duration of the dispense stage and the flow rate of the diluent, and determining the duration of the flush stage based at least in part on the difference between the volume of the solution discharged during the dispense stage and the total volume of solution to be dispensed.

In another embodiment of the invention, a computer program product for performing the dispensing operation is provided. The computer program product comprises a non-transitory computer-readable storage medium and program code stored on the non-transitory computer-readable storage medium. The program code is configured to, when executed by one or more processors, cause the one or more processors to receive the first signal indicative of the pressure of the diluent, determine the duration of the dispense stage of the dispensing operation based at least in part on the pressure of the diluent, and cause the diluent to flow through the eductor for the determined duration of the dispense stage.

In another embodiment of the invention, another dispensing system is presented. The dispensing system comprises a flush manifold including a plurality of intake ports, the eductor, and a check valve. The eductor includes the inlet port that is selectively fluidically coupled to the source of the diluent, a pickup port fluidically coupled to a source of the chemical product, and the discharge port configured to discharge the chemical solution in response to the diluent being coupled to the inlet port. The check valve couples the discharge port of the eductor to one of the intake ports of the flush manifold.

In another aspect of the dispensing system, the check valve comprises an upstream chamber, a downstream chamber fluidically coupled to the upstream chamber by an opening, and a closing member configured to fluidically isolate the downstream chamber from the upstream chamber by covering the opening absent a flow of fluid from the upstream chamber to the downstream chamber.

In another aspect of the dispensing system, the check valve further comprises an elastic member that urges the closing member into contact with the opening absent the flow of fluid from the upstream chamber to the downstream chamber.

In another aspect of the dispensing system, the opening is defined by a valve seat.

In another aspect of the dispensing system, the check valve provides a dynamic flood ring that has a first resistance to the flow of fluid through the eductor in a first state, and a second resistance to the flow of fluid higher than the first resistance in a second state.

In another aspect of the dispensing system, the first state is an open state and the second state is a closed state.

In another aspect of the dispensing system, the check valve maintains the eductor in a flooded state when the dynamic flood ring is in the second state.

In another embodiment of the invention, another method of performing the dispensing operation is presented. The method includes providing a flow of liquid to the inlet port of the eductor sufficient to flood the eductor, in response to the flow of liquid being provided to the inlet port, providing the first resistance to the flow of liquid out of the discharge port of the eductor, and in response to the flow of liquid to the inlet port being reduced, providing the second resistance to the flow of liquid out of the discharge port.

In another aspect of the method, the first resistance is lower than the second resistance.

In another aspect of the method, the first resistance optimizes suction at the pickup port of the eductor, and the second resistance maintains the eductor in the flooded state.

In another aspect of the method, providing the first resistance comprises moving the closing member out of contact with the opening in response to the flow of liquid, the movement compressing the elastic member, and providing the second resistance comprises moving the closing member into contact with the opening in response to urging by the elastic member.

The above summary presents an overview of some embodiments of the invention to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
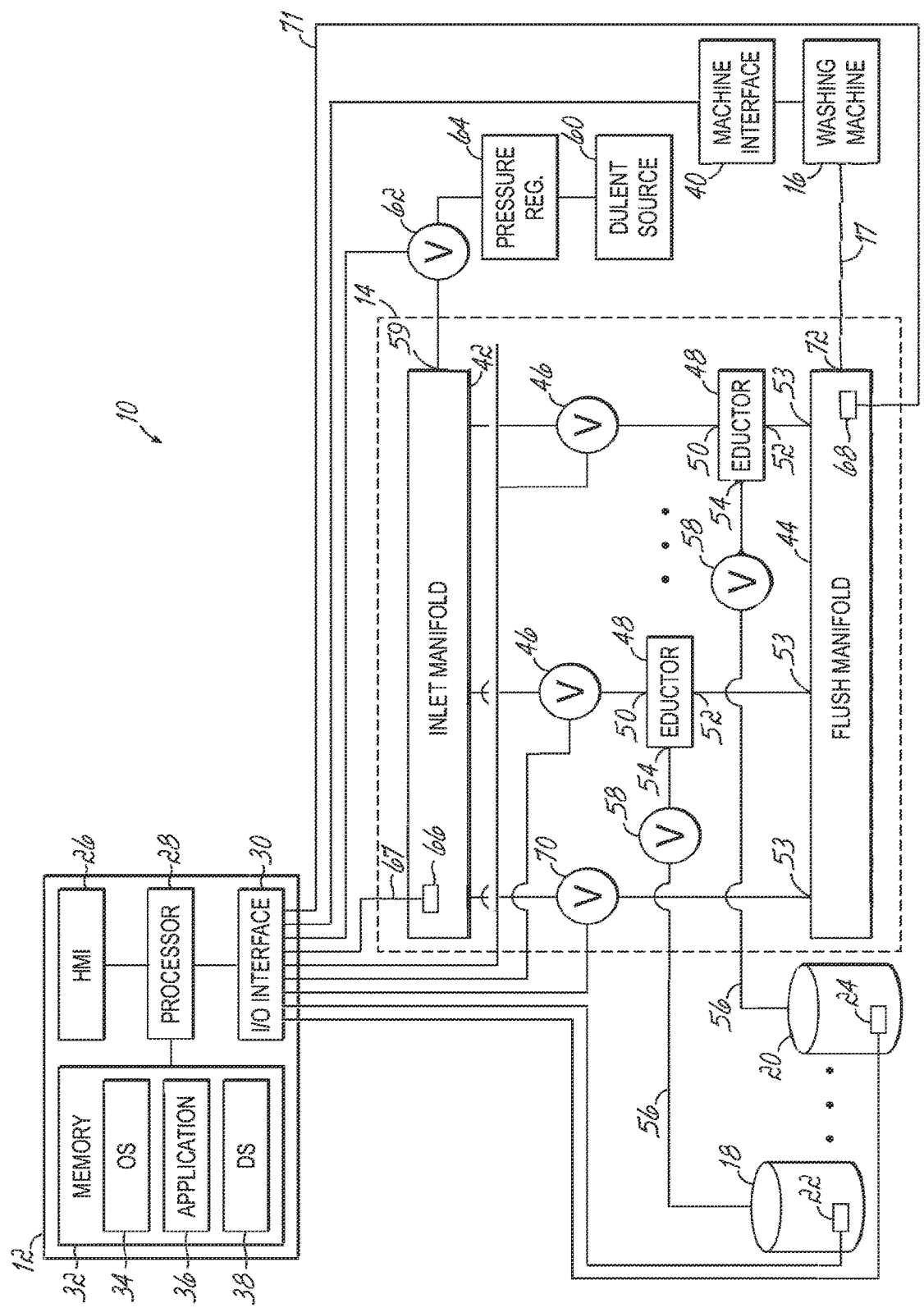
FIG. 1 is a diagrammatic view of an operating environment of an exemplary dispensing system including a controller and a dispenser having a concentration sensor in accordance with an embodiment of the invention.

FIG. 1 depicts an exemplary operating environment for a dispensing system 10 in accordance with an embodiment of the invention. The dispensing system 10 includes a controller 12 and a dispenser 14, and is configured to dispense chemical solutions to a point of use, such as a washing machine 16, through a dispense line 17. The operating environment of the dispensing system 10 may include one or more sources of a chemical product 18, 20 that are fluidically coupled to the dispenser 14. Exemplary chemical products 18, 20 may include chemicals such as detergents, water softening agents, bleaches, and the like. Each source of chemical product 18, 20 may include a level sensor 22, 24 that provides a signal indicative of a level of chemical product 18, 20 remaining in the source to the controller 12.

The controller 12 may include a Human Machine Interface (HMI) 26, a processor 28, an input/output (I/O) interface 30, and a memory 32. The HMI 26 may include output devices, such as an alphanumeric display, a touch screen, and/or other visual and/or audible indicators that provide information from the processor 28 to a user of the dispensing system 10. The HMI 26 may also include input devices and controls, such as an alphanumeric keyboard, a pointing device, keypads, pushbuttons, control knobs, etc., capable of accepting commands or input from the user and transmitting the entered input to the processor 28.

The processor 28 may include one or more devices configured to manipulate signals (analog or digital) based on operational instructions that are stored in memory 32. Memory 32 may be a single memory device or a plurality of memory devices including but not limited to read-only memory (ROM), random access memory (RAM), volatile memory, non-volatile memory, static random-access memory (SRAM), dynamic random-access memory (DRAM), flash memory, cache memory, or any other device capable of storing information. Memory 32 may also include a mass storage device (not shown), such as a hard drive, optical drive, tape drive, non-volatile solid-state device or any other device capable of storing digital information.

Processor 28 may operate under the control of an operating system 34 that resides in memory 32. The operating system 34 may manage controller resources so that computer program code embodied as one or more computer software applications 36 (such as a dispensing operation application) residing in memory 32 may have instructions executed by the processor 28. In an alternative embodiment, the processor 28 may execute the applications 36 directly, in which case the operating system 34 may be omitted. One or more data structures 38 may also reside in memory 32, and may be used by the processor 28, operating system 34, and/or application 36 to store data.

The I/O interface 30 operatively couples the processor 28 to other components in the operating environment, such as the dispenser 14, washing machine 16, and level sensors 22, 24. The I/O interface 30 may include signal processing circuits that condition incoming and outgoing signals so that the signals are compatible with both the processor 28 and the components to which the processor 28 is coupled. To this end, the I/O interface 30 may include analog to digital (A/D) and/or digital to analog (D/A) converters, voltage level and/or frequency shifting circuits, optical isolation and/or driver circuits, and/or any other analog or digital circuitry suitable for coupling the processor 28 to the other components in the operating environment.

The I/O interface 30 may be coupled to the washing machine 16 by a machine interface 40. The machine interface 40 may be configured to transform high voltage trigger signals generated by the washing machine 16 into lower voltage signals suitable for the I/O interface 30 of controller 12 and transmit these low voltage trigger signals to the controller 12. The signals may be transmitted over one or more dedicated signal lines, e.g., using a multi-conductor cable, or over a signal serial data line. For embodiments using a serial data line to communicate with the controller 12, the machine interface 40 may further include a processor, a memory in communication with the processor, and a user interface that enables programing of the machine interface 40 to translate trigger signals into a suitable serial communication protocol. Machine interfaces are described in U.S. Pat. No. 9,447,536, issued Sep. 20, 2016, the disclosure of which is incorporated by reference herein in its entirety.

The dispenser 14 may include an inlet manifold 42, a flush manifold 44, and one or more selector valves 46. Each selector valve 46 may selectively fluidically couple the inlet manifold 42 to an inlet port 50 of a respective eductor 48 in response to a signal received from the controller 12. In addition to the inlet port 50, each eductor 48 may further include a discharge port 52 fluidically coupled to an intake port 53 of the flush manifold 44, and a pickup port 54 fluidically coupled to a feed line 56 from one of the one or more sources of chemical product 18, 20. In an embodiment of the invention, one or more of the pickup ports 54 may be coupled to the feed line 56 by a check valve 58 to prevent a back-flow from the flush manifold 44 into the source of chemical product 18, 20.

The inlet port 50 may be coupled to the discharge port 52 by one or more passages that are configured to produce suction at the pickup port 54 in response to a flow of diluent through the eductor 48. The eductor 48 may operate by forcing the diluent through a conical body that creates a pressure differential between the inlet port 50 and discharge port 52. This pressure differential may generate a vacuum inside the eductor 48 that, in turn, generates suction at the pickup port 54. An exemplary eductor 48 that may be suitable for use in embodiments of the invention is described in U.S. Pat. No. 6,634,376, issued Oct. 21, 2003, the disclosure of which is incorporated by reference herein in its entirety.

The inlet manifold 42 may include an input port 59 that is coupled to a source of diluent 60 by an inlet valve 62 and/or a pressure regulator 64. The pressure regulator 64 may regulate the pressure of the diluent 60 provided to the inlet manifold 42. The inlet valve 62 may be configured to selectively couple the inlet manifold 42 to the source of diluent 60 in response to signals from the controller 12. The pressure regulator 64 may be configured to maintain the pressure of the diluent 60 in the inlet manifold at a constant level so long as the pressure provided by the source of diluent 60 remains above a minimum level.

The pressure of the diluent 60 in the inlet manifold 42 may affect the rate at which diluent 60 flows through the eductors 48. By isolating the inlet manifold 42 from variations in diluent pressure provided by the source of diluent 60, the pressure regulator 64 may reduce variances in the concentration of solutions provided to the point of use. For example, regulating the pressure of the diluent may prevent solutions provided to the point of use from being "leaned out" beyond their desired concentration levels by excessive diluent flow levels through the eductors 48.

The dispenser 14 may further include a pressure sensor 66 located downstream of the inlet valve 62, such as in the inlet manifold 42. The pressure sensor 66 may be configured to sense the pressure of the diluent 60 on an inlet manifold side of the inlet valve 62 and provide a signal 67 indicative of the sensed pressure to the controller 12. One sensor that may be suitable for use as pressure sensor 66 is the PX26 series pressure sensor available from Omega Engineering of Stamford, Connecticut, United States. The pressure sensor 66 may dynamically sense changes in the pressure of the diluent 60 during a dispensing operation that includes one or more dispense and/or flush stages. Monitoring the pressure of the diluent 60 during a dispensing operation may enable the controller 12 to sense a drop of inlet manifold pressure (e.g., due to a drop in the pressure provided by the source of diluent 60) during the dispensing operation, which may cause a corresponding drop in a flow rate of the diluent 60 through the active eductor 48.

The pressure sensor 66 may be located proximate to a flush valve 70 and/or the selector valve 46 that is used to perform flush stages. The pressure sensor 66 may be operated by an excitation voltage (e.g., a 10 V DC voltage), and may output the signal 67 (e.g., millivolt range voltage) indicative of the pressure sensed by the pressure sensor 66, e.g., a voltage that is proportional to the incoming diluent pressure. The signal 67 may be coupled to the processor 28 via the I/O interface 30 to provide the processor 28 with information on pressure with respect to time during operation of the dispensing system 10. The output signal may be routed to the processor 28 on a local printed circuit board or to a remotely operated controller 12.

The dispenser 14 may further include a concentration sensor 68 configured to detect the concentration of one or more substances (e.g., chemical product, mineral salt, and/or other substance) in the diluent 60 and/or dispensed solutions and provide a signal 71 indicative of the concentration to the controller 12. The concentration sensor 68 may include an optical probe and/or a conductive probe and may be located in the flush manifold 44 (depicted) or another point downstream of the eductors 48. For example, the concentration sensor 68 may be built into an output port 72 of flush manifold 44. In an alternative embodiment of the invention, the concentration sensor 68 and/or an additional concentration sensor (not shown) may be located in the inlet manifold 42 and used to determine concentrations of substances in the diluent 60 prior to mixing with the chemical products 18, 20. Advantageously, locating the concentration sensor 68 in the flush manifold 44 may allow the dispensing system 10 to monitor multiple dispense channels and provide solutions to multiple points of use using a single concentration sensor 68 rather than separate sensors that detect the concentration of the chemical product for each individual chemical and/or point of use.

The signal 71 provided to the controller 12 by concentration sensor 68 may be used to determine a characteristic of the solution in the flush manifold 44, such as the concentration of one or more substances (e.g., calcium carbonate and/or magnesium) that contribute to the hardness in the diluent 60 and/or the concentration of one or more of the chemical products 18, 20. The signal 71 may be an analog signal (e.g., voltage or current) and/or a digital signal. For embodiments in which the signal is a digital signal, the concentration sensor 68 may include electronic circuitry that quantifies the characteristic, e.g., as a concentration level in parts-per-million. The controller 12 may be configured to sample the signal 71 and store these samples and/or the concentrations determined therefrom in memory 32 as a sequence of readings indicative of the characteristic. The concentration sensor 68 may allow the controller 12 to adjust the amount of chemical product dispensed to the point of use during the dispensing operation to account for water hardness and/or variations in chemical product flow rates through the eductors 48. The dispensing system 10 may thereby provide more effective solutions as compared to dispensing systems lacking the concentration sensor feature.

In an embodiment of the invention, the concentration sensor 68 may comprise a conductivity probe having electrodes that detect the conductivity of liquids in the flush manifold 44. The conductivity probe may provide a signal to the controller 12 in the form of an impedance, voltage, or current level indicative of the detected conductivity. The controller 12 may be configured to determine the conductivity of the incoming diluent, e.g., during a pre-dispense stage or post-dispense stage flush of the flush manifold 44. Conductivity probes and methods of determining the conductivity of a solution are described in U.S. Pat. No. 8,926,834 issued Jan. 6, 2015, the disclosure of which is incorporated by reference herein in its entirety.

The flush valve 70 may selectively fluidically couple the inlet manifold 42 to the flush manifold 44 in response to signals from the controller 12. This may allow the controller 12 to execute flush stages before and/or after activating the selector valves 46 to dispense chemical solutions. These flush stages may be used to clear the flush manifold 44 of chemical solutions between dispense stages, transport previously dispensed chemical solutions to the point of use, and/or provide a desired amount of diluent 60 to the point of use. In an alternative embodiment of the invention, this flushing feature may be enabled by capping the pickup port 54 of one of the eductors 48 (e.g., the eductor 48 furthest from the output port 72 of flush manifold 44) and activating the respective selector valve 46 to flush the flush manifold 44. In this case, the flush valve 70 may be omitted.

The controller 12 may respond to a sensed drop in the pressure of the diluent 60, for example, by increasing an amount of time the respective selector valve 46 is kept open. This change in the duration of the dispense stage may compensate for a leaning out of the chemical solution by increasing the volume of the chemical solution provided to the point of use. The leaning out may be due to a reduction in the rate the chemical product 18, 20 is drawn into pickup port 54 caused by a lower flow rate of diluent 60 through the eductor 48 than would have occurred if the pressure of the diluent 60 had not dropped.

The increase in duration of the dispense stage may be determined by the controller 12 based on a known function of the flow rate of the pickup port 54 versus the flow rate of diluent 60 through the eductor 48. The flow rate of diluent 60 through the eductor 48 may be determined by the controller 12 based on a known function of the flow rate through the eductor 48 verses diluent pressure at the inlet port 50. In an alternative embodiment of the invention, the period of time may be determined using a predefined algorithm (e.g., a lookup table) that maps the flow rate of chemical product 18, 20 into the pickup port 54 to the pressure at the inlet port 50. The controller 12 may thereby alter the dispensing operation to compensate for pressure changes in the diluent 60 so that the correct dose of chemical product 18, 20 is delivered to the point of use.

To keep the total volume of the solution delivered to the point of use consistent between dispensing operations, the controller 12 may adjust the volume of diluent 60 dispensed during a subsequent flush stage to compensate for changes in the volume of the chemical solution dispensed during the dispense stage. For example, the duration of a post-dispense flush stage may be determined based on a difference between the total volume of solution to be dispensed to the point of use during the dispensing operation, and the volume of the chemical solution/diluent dispensed during any prior flush and/or dispense stages.

During a dispense stage of a dispensing operation, the chemical product 18, 20 injected into the diluent 60 flowing through the eductor 48 may change the conductivity, refractive index, fluorescent properties, and/or other characteristics of the diluent 60. Thus, the chemical solution dispensed during the dispense stage may have a different conductivity and/or refractive index than the diluent 60 dispensed during a flush stage. After the dispense stage, the controller 12 may execute a flush stage to help remove any residual chemical product from the flush manifold 44, and/or to transport the chemical solution to the point of use. This flush stage may be executed at the end of the dispensing operation, and may return the conductivity and/or refractive index sensed by the concentration sensor 68 back to a value associated with the diluent 60.

If the controller 12 fails to detect changes in the concentration, conductivity, and/or optical characteristics of the solution flowing through the flush manifold 44 in accordance with a predetermined pattern for the dispensing operation being performed, the controller 12 may determine that a source of chemical product 18, 20 is running low or has run out, or that there is some other problem with the dispensing system. The characteristics of the solution flowing through the flush manifold 44 may be in accordance with the predetermined pattern if the characteristics are within a predetermined threshold of an expected value at one or more points in time during the dispensing operation.

In response to a determination the characteristics are not in accordance with the predetermined pattern, the controller 12 may alert the user as to which source of chemical product 18, 20 and/or dispensing channel appears to have an issue. The controller 12 may also disable activation of the selector valve 46 associated with that source of chemical product 18, 20 until the event is cleared. Advantageously, the concentration sensor 68 may be used in this way to determine the status of each source of chemical product 18, 20 being used. The ability to detect the concentration of chemical products in the flush manifold using the single concentration sensor 68 may allow the dispensing system to avoid placing individual sensors on each feed line 56 to detect the presence of absence of chemical product.

Figure 10:
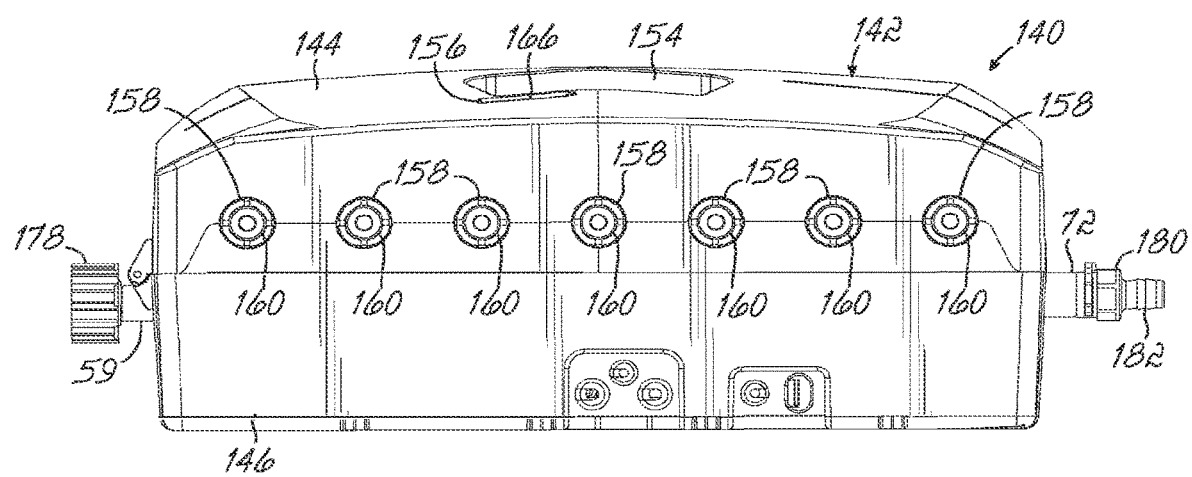
FIG. 10 is a bottom view of the dispenser of FIG. 9.
Figure 11:
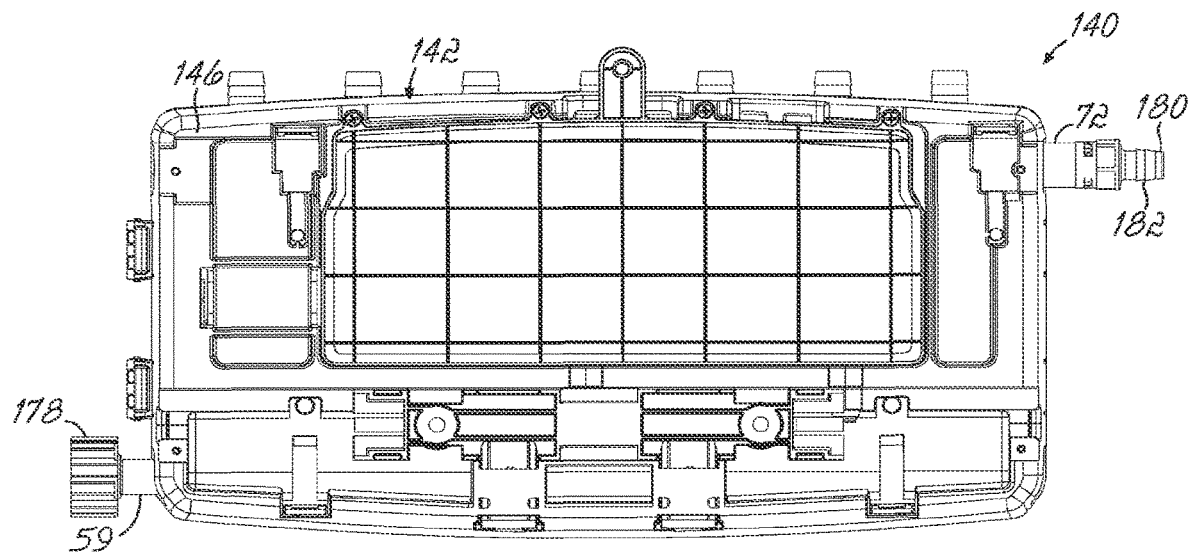
FIG. 11 is a back view of the dispenser of FIG. 9.
Figure 12:
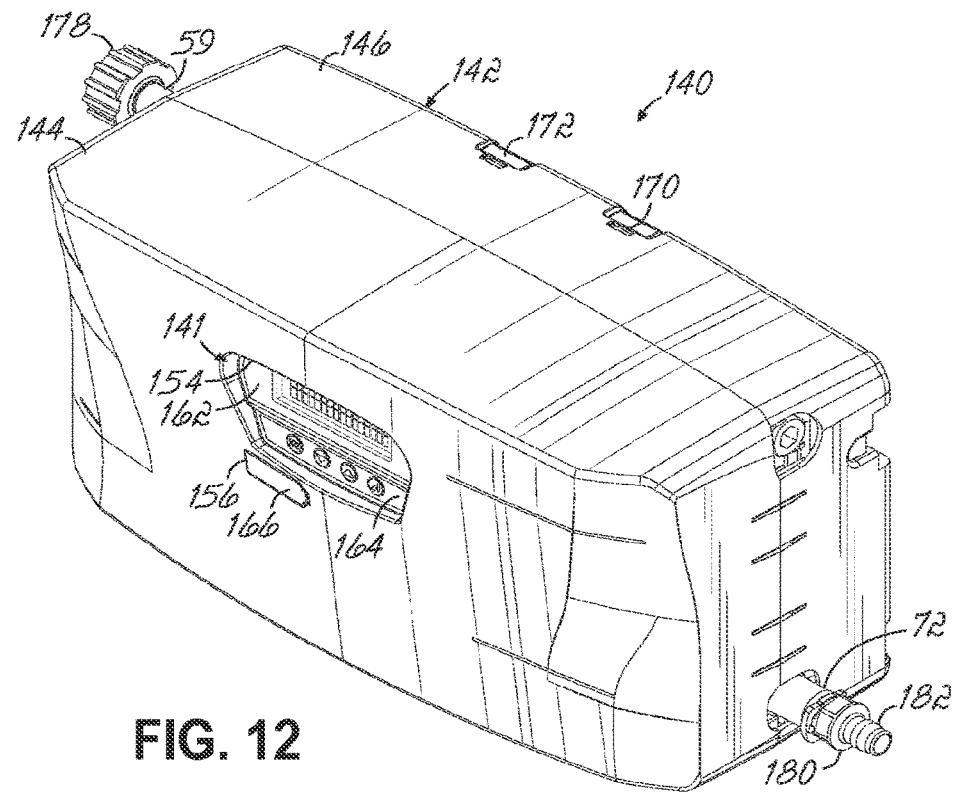
FIG. 12 is a perspective view of the dispenser of FIG. 9.

In an alternative embodiment of the invention, the controller 12 may use a demultiplexer to control the dispenser 14 rather than the processor 28. In this embodiment, the demultiplexer may be used to implement logic functions that operate the dispenser 14. In another alternative embodiment of the invention, the dispenser 14 may include an interface circuit 74 (FIG. 10). The interface circuit 74 may communicate with the controller 12 using a serial data line. The interface circuit 74 may be configured to receive data from the controller 12 over the serial data line, and to activate/deactivate valves 46, 70 based on the received data. The interface circuit 74 may be further configured to transmit data to the controller 12 using the serial data line. The transmitted data may be indicative of signals generated by various sensors 66, 68. The interface circuit 74 may also use flow regulator and/or detection devices to monitor the pressure of the source of diluent 60 and transmit these readings to the controller 12. This may enable the controller 12 to adjust the period of time the selector valves 46 and/or inlet valve 62 is activated when the sensed pressure is inadequate to produce full suction in one or more of the eductors 48.

By way of example, the pressure regulator 64 may be configured so that the pressure at the pressure sensor 66 is normally at a level (e.g., 30 PSI) that allows the eductors 48 to generate their rated suction when the selector valve 46 is open. When an event occurs that drops the pressure of the diluent 60, such as another draw on the source of diluent 60, the controller 12 may detect the pressure drop based on a change in the signal generated by the pressure sensor 66. In response to determining that the inlet manifold pressure has dropped below the minimum pressure at which the eductors 48 generate rated suction, the controller 12 may generate an alarm using the HMI 26 or some other indicator, e.g., a buzzer or light. The controller 12 may also compensate for the reduced suction at the pickup port 54 of the active eductor 48 by keeping the selector valve 46 open for a longer period of time as described above. For dispensing systems using a common diluent inlet line, a single pressure sensor 66 may be used for all dispensing operations. The controller 12 may also be configured to verify the dispensing system 10 is operating properly based at least in part on the output of the concentration sensor 68.

Dispensing events, such as changes in the pressure of the diluent 60, concentration levels of substances in the diluent 60 and/or dispensed solution, and/or low chemical product conditions, may be logged in memory 32 for later analysis, and may also trigger visual and/or audible alarms to notify the user of the event.

Figure 2:
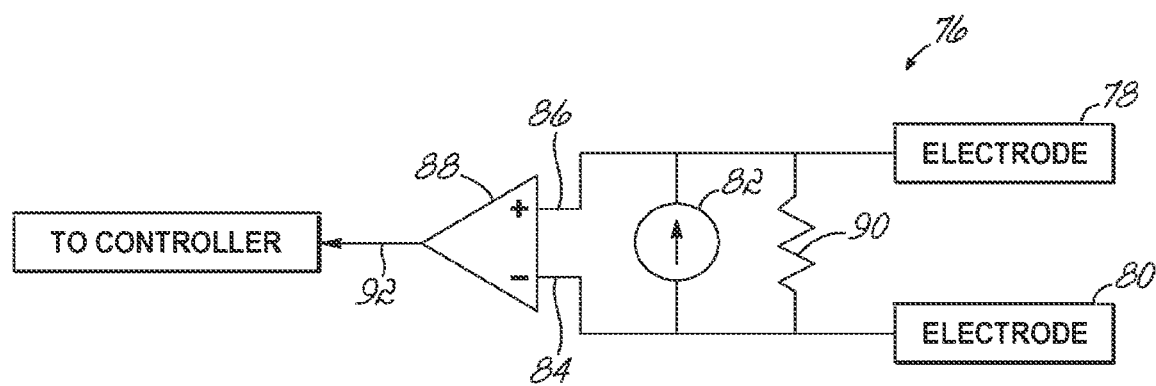
FIG. 2 is a diagrammatic view of an admittance probe including a current source and a buffer amplifier that may be used to implement the concentration sensor of FIG. 1.

FIG. 2 depicts an admittance probe 76 that may comprise all or part of the concentration sensor 68 in accordance with an embodiment of the invention. The admittance probe 76 may include a plurality of electrodes 78, 80 coupled to a current source 82 and to the inputs 84, 86 of a buffer amplifier 88. The electrodes 78, 80 may be formed from any suitable conductive material, such as Hastelloy, which is a corrosion resistant nickel-molybdenum-chromium alloy available from Haynes International, Inc. of Kokomo, Indiana, United States. The output impedance of the current source 82 and the impedance of the inputs 84, 86 of buffer amplifier 88 may be high, e.g., on the order of several megaohms. The current provided by the current source 82 may be a pulsed current having an amplitude on the order of a microamp. The admittance probe 76 may further include an output resistor 90 (e.g., a 30 kΩ resistor) that provides a path for the current of the current source 82 and to set the impedance between the electrodes 78, 80. In an embodiment of the invention, the output resistor 90 may represent the output impedance of the current source 82. The buffer amplifier 88 may be configured to output a low impedance signal 92 indicative of a voltage across the electrodes 78, 80 and/or output resistor 90.

Figure 3:
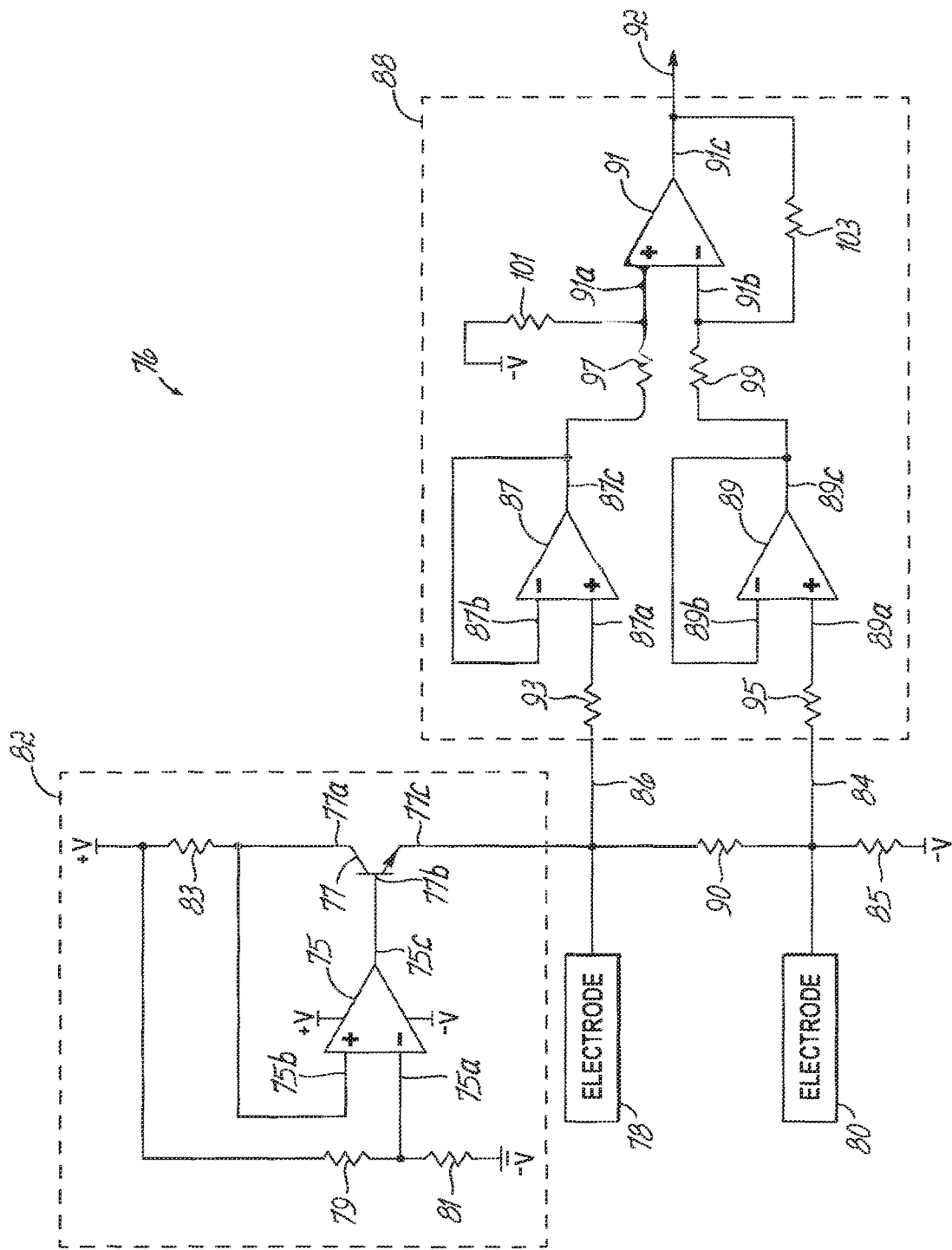
FIG. 3 is a diagrammatic view of an embodiment of the admittance probe of FIG. 2 showing additional details of the current source and buffer amplifier.

FIG. 3 depicts an exemplary embodiment of the admittance probe 76 in which the current source 82 includes an operational amplifier 75 and a transistor 77. The operational amplifier 75 may include an inverting input 75*a*, a non-inverting input 75*b*, and an output 75*c*. The transistor 77 may include a collector 77*a*, a base 77*b*, and an emitter 77*c*. The inverting input 75*a* of operational amplifier 75 may be coupled to a positive voltage source +V (e.g., $V_{CC}$) by a biasing resistor 79 (e.g., a 470Ω resistor) and to a negative voltage source −V (e.g., ground) by another biasing resistor 81 (e.g., a 4.7 kΩ resistor). The non-inverting input 75*b* of operational amplifier 75 may be coupled to the collector 77*a* of transistor 77.

The collector 77*a* of transistor 77 and the non-inverting input 75*b* of operational amplifier 75 may be coupled to the positive voltage source +V by another biasing resistor 83 (e.g., a 470Ω resistor). The output 75*c* of operational amplifier 75 may be coupled to the base 77*b* of transistor 77. The emitter 77*c* of transistor 77 may be coupled to the electrode 78 and provide the output of the current source 82. A resistor 85 (e.g., a 100 kΩ resistor) may couple the electrode 80 to the negative voltage source −V and provide a path for the current output by current source 82 in the event the electrodes 78, 80 are in a high impedance environment.

The buffer amplifier 88 may include one or more operational amplifiers 87, 89, 91 each including a respective non-inverting input 87*a*, 89*a*, 91*a*, inverting input 87*b*, 89*b*, 91*b*, and output 87*c*, 89*c*, 91*c*. The non-inverting inputs 87*a*, 89*a* of operational amplifiers 87, 89 may be coupled to respective electrodes 78, 80 by respective input resistors 93, 95 (e.g., 100 kΩ0 resistors). The outputs 87*c*, 89*c* of operational amplifiers 87, 89 may be coupled to their respective inverting inputs 87*b*, 89*b* so that the operational amplifiers 87, 89 provide unity gain voltage follower input stages of the buffer amplifier 88.

The output 87*c* of operational amplifier 87 may be coupled to the non-inverting input 91*a* of operational amplifier 91 by a resistor 97 (e.g., a 110 kΩ resistor) and the output 89*c* of operational amplifier 89 may be coupled to the inverting input 91*b* of operational amplifier 91 by another resistor 99 (e.g., a 110 kΩ resistor). The non-inverting input 91*a* of operational amplifier 91 may be coupled to the negative voltage supply −V by a resistor 101 (e.g., a 220 kΩ resistor), and the inverting input 91*b* may be coupled to the output 91*c* of operational amplifier 91 by a feedback resistor (e.g., a 220 kΩ resistor) to provide a differential amplifier output stage.

In operation, the controller 12 may determine the electrical admittance of the liquid (e.g., chemical solutions and/or diluent 60) in the flush manifold 44 on a periodic basis based on the signal 92 output by the admittance probe 76. This process may be distinguished from conventional measurements using a conductivity type concentration sensor, which typically includes a voltage source that operates continuously. Advantageously, using a current source 82 to determine an admittance value of liquids in the flush manifold 44 may avoid the need to characterize mechanical constants of the admittance probe 76, the size or configuration of the electrodes 78, 80, spatial relationships between the tips of the electrodes 78, 80, or temperature correction algorithms that compensate for changes in the signal 92 due to variations in the temperature of the liquid.

The admittance probe 76 may be configured to detect the admittance of the solution being dispensed proximate to the output port 72 of flush manifold 44. Because only a portion of the electrodes 78, 80 must be in contact with the solution being measured, the circuitry (e.g., current source 82 and buffer amplifier 88) may be located remotely from the electrodes 78, 80, e.g., on the printed circuit board of the controller 12.

The admittance probe 76 may have several advantages over sensors using voltage sources. For example, the high output impedance of the current source 82 may avoid measurement errors that could otherwise be caused by films or coatings forming on the electrodes 78, 80. That is, any additional series resistance (e.g., several hundred or several thousand ohms) caused by coatings on the electrodes 78, 80 may be insignificant compared to the high input impedance of admittance probe 76. The high output impedance of the current source 82 may avoid the need to compensate for temperature and resistive losses causes by long wire leads between the current source 82 and the electrodes 78, 80. Long leads can also add parasitic capacitance, which in turn may cause conventional monitoring circuits to oscillate. The signal 92 output by the admittance probe 76 may allow the controller 12 to detect changes (e.g., a drop) in the concentration of the ions in a solution based on changes in ionic conduction through the solution as the dispensed chemicals mix with the diluent 60.

The current source 82 may be inactive until a measurement is to be made. In response to receiving power or some other suitable signal (e.g., from the controller 12), the current source 82 may output one or more pulses of current to the electrodes 78, 80. The admittance probe 76 may include a controlled power-on time that provides a pulsed current signal to the electrodes 78, 80, thereby enabling the concentration sensor 68 to be activated by the application of power. The pulsed current signal may reduce any effects of polarization that could contribute to fouling of the electrodes 78, 80. Changes in the admittance of the solution in the flush manifold 44 may be revealed by the microamp level pulsed signal, any may have a direct correlation to the admittance value of any type of conductive liquid. The signal resulting from the current pulse may be read and converted to a format that can be transmitted to the controller 12, e.g., a voltage and/or frequency component. The output signal 92 may be coupled to an analog-to-digital (A/D) converter of the I/O interface 30, to an integrated A/D converter in the processor 28, and/or a capture and compare I/O port. The controller 12 may use the admittance information to make changes to the dispensing operation on the fly as the characteristics diluent 60 and/or chemical solutions change during a dispensing operation.

During installation of the dispensing system 10, a calibration process may be performed during which diluent 60 at a predetermined pressure is provided to the inlet manifold 42. The controller 12 may include a calibration mode that allows the user to measure the admittance of the solution in the flush manifold 44 while each eductor 48 is dispensing chemical. While operating in the calibration mode, the controller 12 may sample the output signal 92 and store the sampled value in a nonvolatile memory location for each chemical dispensed. This value may then be used as a reference value to help determine if the dispensing system 10 is operating properly. For example, during operation of the chemical dispenser, the admittance probe 76 may measure the admittance value of the chemical product 18, 20 and diluent 60 mixture. These admittance values may be compared to the admittance values measured during installation to verify that the active eductor 48 is operating properly.

The controller 12 may use data obtained from the pressure sensor 66 and concentration sensor 68 independently or in combination to provide a reliable closed loop dispensing process during all or part of the dispensing operation. If the concentration measurements (e.g., the admittance or optical characteristics of the solution as indicated by output signal 71) do not follow the pattern of concentration verses time defined during the calibration process, the controller 12 may determine that the diluent pressure at the inlet manifold 42 has changed, e.g., is too low. The controller 12 may verify this determination based on readings from the pressure sensor 66. If the output signal of the pressure sensor 66 indicates that the diluent pressure level is in a valid operating range when the concentration levels are incorrect, it may be indicative that the chemical product 18, 20 is running low (e.g., if the concentration levels are moving over a range of values as slugs of chemical are periodically drawn in to the eductor 48) or has run out (e.g., if the concentration levels are consistently low). In response to detecting a low chemical product condition, the controller 12 may alert the user as to which chemical product is having a problem via the HMI 26. The controller 12 may also prevent activation of the selector valve for that chemical channel until the low chemical product condition is cleared.

The controller 12 may be configured to display current values of the diluent pressure in the inlet manifold 42 and/or characteristics of the solution in the flush manifold 44 on the HMI 26. The above data, as well as other operational data of the dispensing system 10, may be transmitted to a user device, such as a smart phone or tablet, over a network, e.g., a wireless Wi-Fi or Bluetooth network. The I/O interface 30 of controller 12 may also include a serial data port that enables the controller 12 to communicate locally to a personal computer or other wired network-based device. The dispensing system 10 may thereby indicate the occurrence of a dispensing event visually, audibly, or both, on the HMI 26 of controller 12 or on the user interface of a user device.

Figure 4:
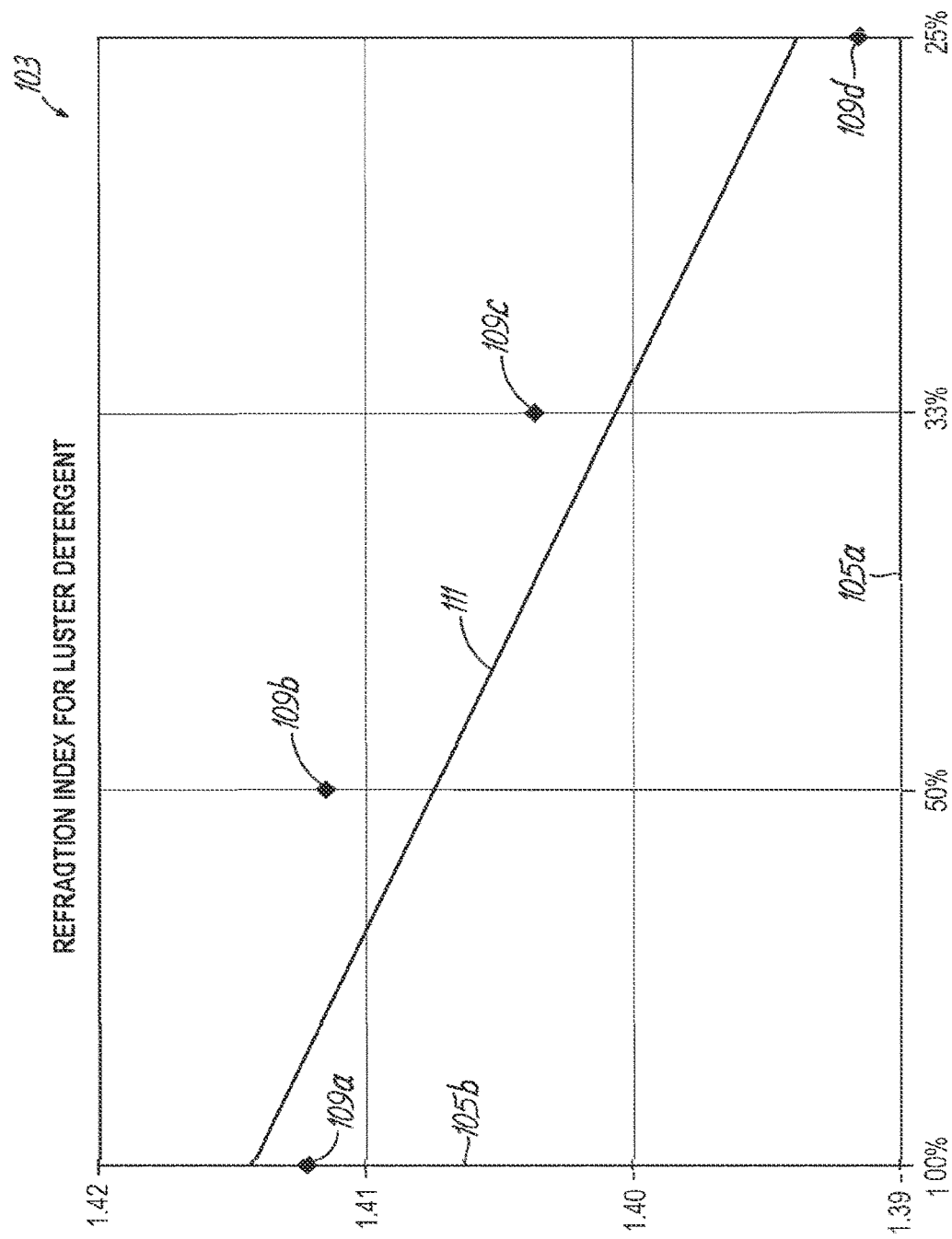
FIG. 4 is a graphical view showing the refractive index of a solution that may be dispensed by the dispensing system of FIG. 1 with respect to the concentration of a chemical product in the solution.

FIG. 4 depicts an exemplary graph 103 including a horizontal axis 105*a* corresponding to a concentration of a chemical product, such as Luster Professional detergent, which is available from Procter & Gamble Inc. of Cincinnati Ohio, a vertical axis 105*b* corresponding to a refractive index of the solution, data points 109*a*-109*d* indicative of the refractive index at specific concentrations of the chemical product, and a plot 111 showing a linear approximation of the refractive index of the solution relative to the concentration of the chemical product in the solution. The plot 111 may be, for example, a line determined by applying the least-squares analysis to the data points 109*a*-109*d*.

As can be seen from the graph 103, the addition of the chemical product to the diluent changes its refractive index. The refractive index of a solution may vary from a base refractive index (e.g., n=1.333 for pure water) to that of the chemical solution (e.g., n=1.412 for Luster detergent), with the amount of the change dependent on the concentration of the chemical product in the solution. For example, chemical solutions dispensed to a washing machine may have a refractive index of between 1.37 to 1.49 depending on the chemical product and concentration thereof in the solution. The refractive indexes, or a value of a signal indicative thereof, for individual chemical products may be determined empirically at various concentration levels. These values may be stored as a look up table in memory 32 of controller 12, e.g., during a calibration process, and used to determine concentration levels of the dispensed solutions during operation of the dispensing system 10. In cases where the refractive index of the diluted chemical product changes in a generally linear fashion with respect to the level of dilution, it may also be possible to mathematically predict the refractive index. This prediction may be based upon the volume of diluent and the amount of the chemical solution being pumped through the output section taking into consideration a volume of the cross-sectional area.

In an embodiment of the invention, the concentration sensor 68 may comprise an optical probe. FIGS. 5-8 depict exemplary embodiments of an optical probe 94 that may be used to detect concentrations of substances based on the refractive index of the solution. For example, in addition to the effects of chemical products discussed above, it has been determined that calcium carbonate and magnesium each uniquely affect the refraction index of the diluent 60, and that this effect on the refraction index of the diluent 60 may be detected optically.

Figure 5:
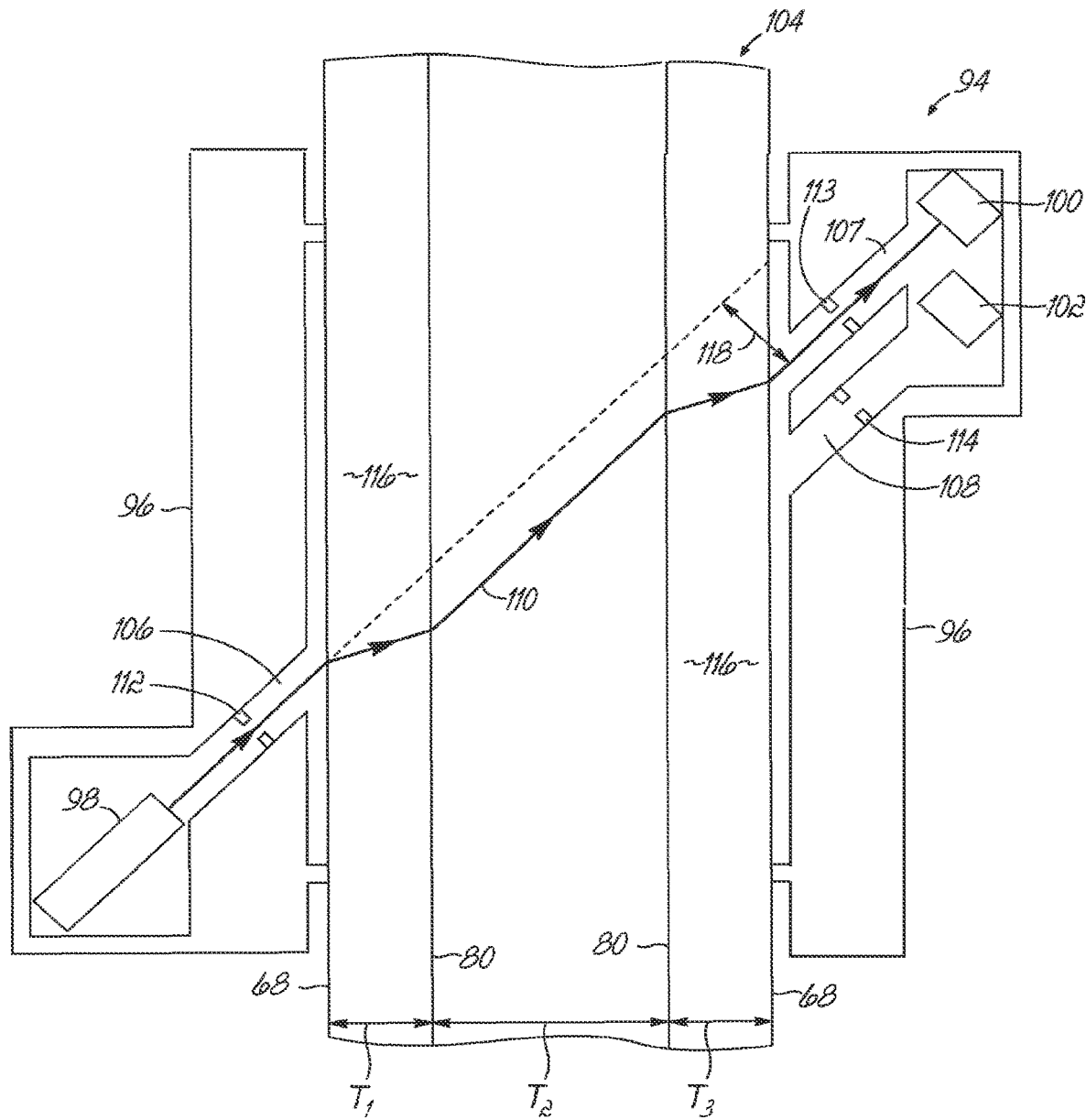
FIG. 5 is a diagrammatic view of an optical probe that may be used to implement the concentration sensor of FIG. 1.
Figure 6:
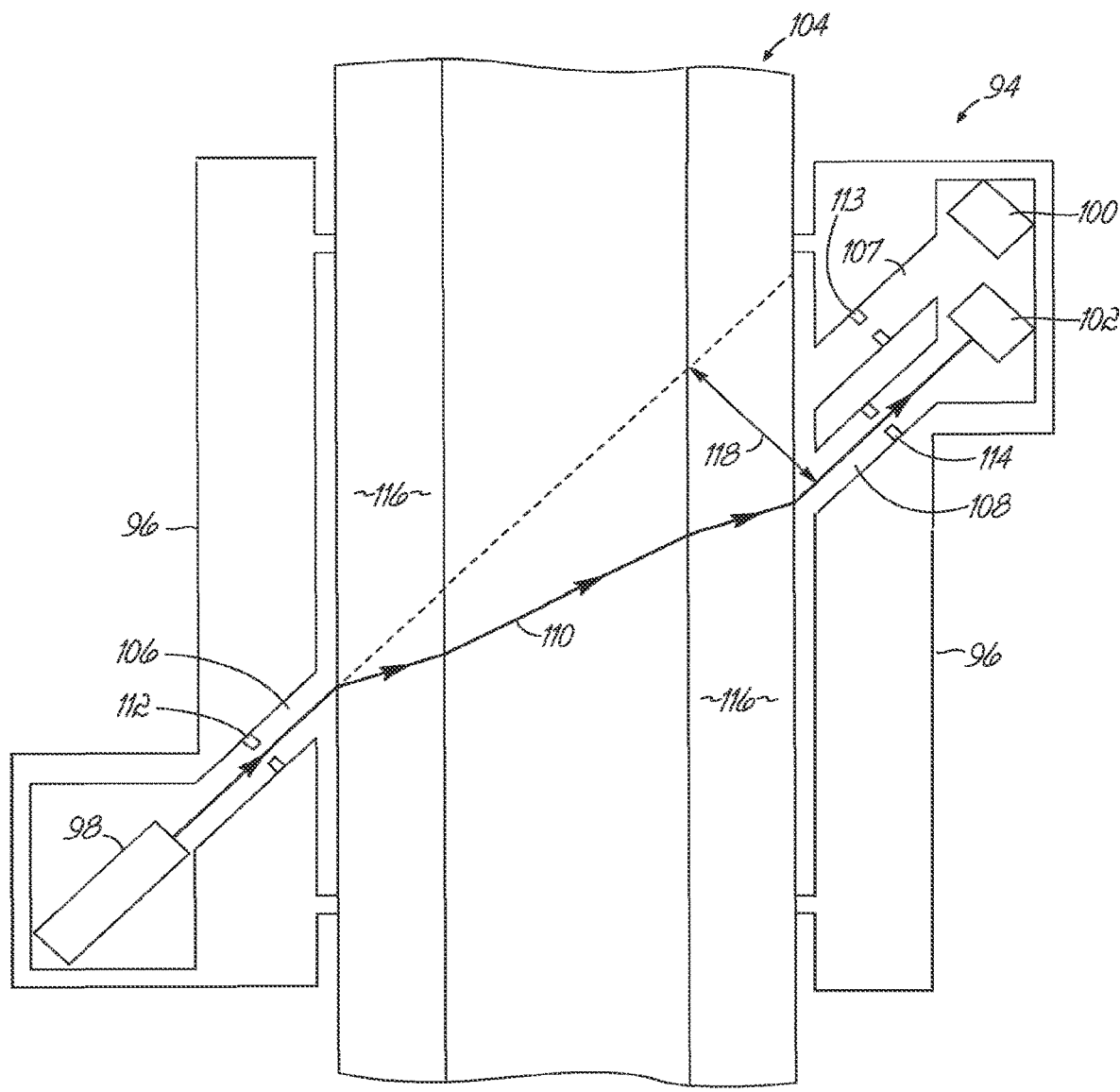
FIG. 6 is a diagrammatic view of another optical probe that may be used to implement the concentration sensor of FIG. 1.

Referring now to FIGS. 5 and 6, the optical probe 94 may include a holder 96, a light source 98, and one or more (e.g., two) photodetectors 100, 102. The holder 96 may be configured to locate the light source 98 and photodetectors 100, 102 in a fixed position relative to a chamber 104 which the solution being measured flows through or otherwise enters. The holder 96 may include one or more channels 106-108 that provide one or more optical paths for a beam of light 110 emitted by the light source 98. Each of the channels 106-108 coupling the light source 98 and photodetectors 100, 102 to the chamber 104 may include an aperture 112-114 that defines an opening having a predetermined size and shape. For example, the source channel 106 may include a circular aperture 112 having a diameter of 2 mm or less, and the photodetector channels 107, 108 may each include a circular aperture 113, 114 having a diameter of 3 mm or less.

The apertures 112-114 may be defined by baffles formed in the channel 106-108 as depicted in FIGS. 5 and 6, or by the diameter of the channel 106-108 itself. The apertures 112-114 may be configured to allow the beam of light 110 to reach one or the other of the photodetectors 100, 102 when the solution in the chamber 104 has a refractive index n specific to that photodetector (e.g., n=1.3 or 1.0), and may shield the photodetectors 100, 102 from the beam of light 110 when the medium in the chamber 104 has a different refractive index.

The chamber 104 may include one or more walls 116 that isolate the other components of the optical probe 94 from the medium in the chamber 104, and that have a refractive index the same as or different from the medium in the chamber 104. The optical probe 94 may be configured to detect concentrations of minerals in the diluent 60 by selecting the dimensions (e.g., $T_1, T_2, T_3$), refractive indexes, and relative locations of the components of the optical probe 94. The configuration of the optical probe 94 may cause the displacement 118 of the beam of light 110 to align the beam of light 110 with a respective photodetector 100, 102 when the medium in the chamber 104 has a specific concentration of a mineral or a chemical product being measured. Optical probes that work based on changes in refractive index are described in application Ser. No. 15/689,255, entitled OUT-OF-PRODUCT DETECTION USING OPTICAL SENSORS and filed on Aug. 29, 2017, the disclosure of which is incorporated by reference herein in its entirety.

Figure 7A:
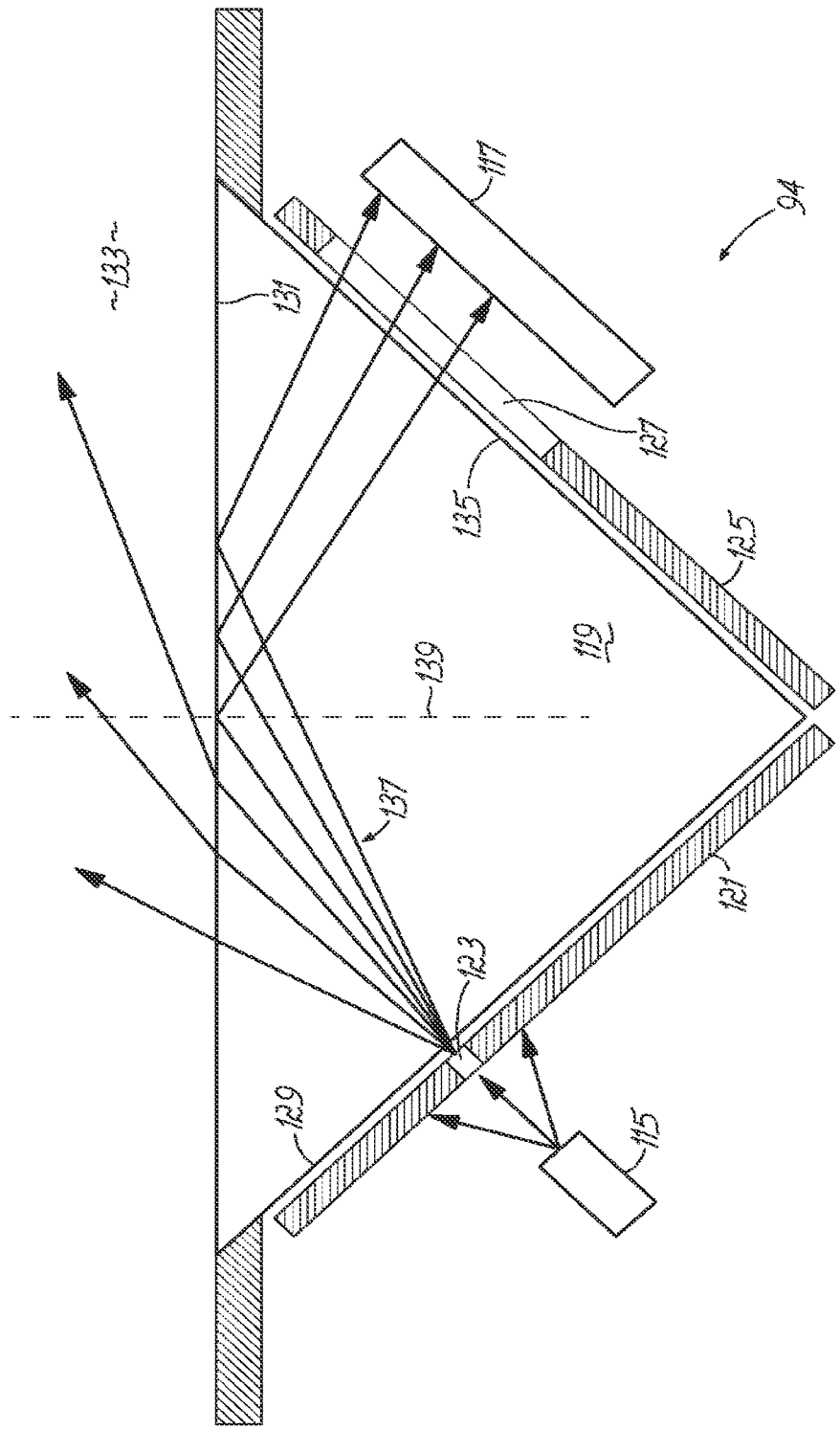
FIGS. 7A and 7B are diagrammatic views of yet another optical probe that may be used to implement the concentration sensor of FIG. 1.
Figure 7B:
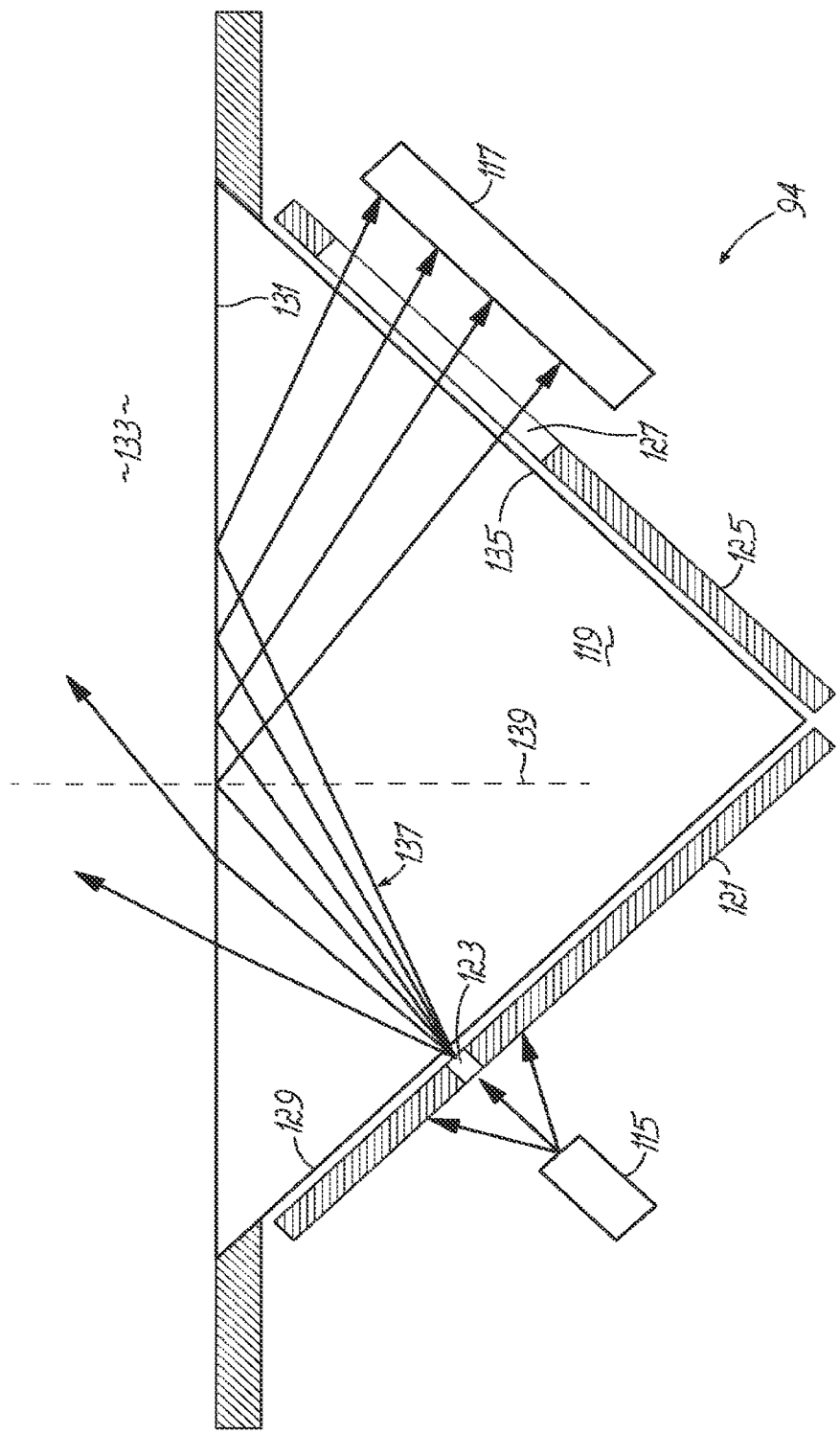

FIGS. 7A and 7B depict an alternative embodiment of the optical probe 94 that includes a light source 115, a sensor 117, an optical element 119 (e.g., a prism), a source mask 121 including a horizontal slot 123, and a detector mask 125 including a vertical slot 127. The light source 115 may include a light emitting diode, such as narrow beam infrared light emitting diode, or any other suitable source of light. The optical element 119 may be made from a transparent material (e.g., glass or plastic) and include a source facing surface 129, a solution facing surface 131 that is optically coupled to a solution 133 (e.g., a solution in the interior of flush manifold 44), and a sensor facing surface 135 that faces the sensor 117. The source mask 121 may be located between the light source 115 and the source facing surface 129 of optical element 119 so that the horizontal slot 123 couples light 137 from the light source 115 into the optical element 119.

The horizontal slot 123 may be configured so that the light 137 is incident on and distributed relatively evenly across the inward facing side of the solution facing surface 131. As a result, the angle of incidence $\theta_i$ between the light 137 and a line normal to the surface 131 may increase with the distance from the horizontal slot 123 to the surface 131. For given indexes of refraction for the optical element 119 and the solution 133, at a specific point indicated by dashed line 139, the angle of incidence $\theta_i$ may reach the critical angle $\theta_c$. At angles of incidence $\theta_i$ less than the critical angle $\theta_c$ (i.e., to the left of dashed line 139), the majority of the light 137 incident on the solution facing surface 131 may pass into the solution 133. However, at angles of incidence $\theta_i$ greater than critical angle $\theta_c$ (i.e., to the right of dashed line 139), there may be total internal reflection that causes the majority of the light 137 to be reflected downward toward the sensor 117 by the solution facing surface 131. The critical angle $\theta_c$ may be determined using the following equation:

$$\theta_C = \arcsin\left(\frac{n_2}{n_1}\right) \qquad \text{Eqn. 1}$$

where $n_1$ is the refractive index of the optical element 119 and $n_2$ is the refractive index of the solution 133.

Thus, for an optical element 119 having a fixed refractive index (e.g., $n_1$=1.53), as the refractive index $n_2$ of the solution 133 increases (e.g., from $n_2$=1.37 to $n_2$=1.49), the location where the light 137 incident on the solution facing surface 131 has an angle of incidence $\theta_i$ equal to the critical angle may move from right to left along the solution facing surface 131 of optical element 119. This movement is depicted by the position of the dashed line 139 shifting from right to left between FIGS. 7A and 7B. The increase in the critical angle $\theta_c$ may further result in the reflected light covering a greater portion of the sensor 117, as shown by the increased number of reflected rays in FIG. 7B as compared to FIG. 7A. Thus, the refractive index of the solution 133 may be inferred by the position and/or size of the illuminated section of the sensor 117.

Advantageously, embodiments of the optical probe 94 using the critical angle to detect the refractive index $n_2$ of solution 133 can be used to provide feedback to the controller 12 on the both the type of chemical product and the duration of the chemical product dispense cycle. The information regarding the refractive index $n_2$ of solution 133 may also be used to determine if there is an issue with the chemical product, such as a low or out of product condition.

Embodiments of the optical probe 94 that rely on critical angles to determine the refractive index of solution 133 are not limited to the exemplary embodiment depicted in FIGS. 7A and 7B. For example, the optical element 119 could have dimensions and angles other than those of the right-angle prism depicted. Optical elements having shapes other than that of a prism or having multiple components could also be used. For example, an optical window could be used to couple the solution to and/or in place of the optical element 119. Although depicted as being oriented perpendicular/parallel to their respective facing surfaces 129, 133, the light source 115 and/or sensor 117 could also be oriented at other angles with respect to the surfaces 129, 133 of optical element 119.

The sensor 117 may include a linear array (e.g., 128×1) of photodiodes or pixels and associated circuitry that allows charge to build up for a selectable period of time on the photodiodes. The sensor 117 may be oriented generally parallel to the sensor facing surface 135 of optical element 119 to capture the arc of the rays exiting the optical element 119. The refractive index $n_2$ of the solution 133 may be determined based on the size of the arc that hits the sensor 117. The sensor 117 may output an analog voltage at the end of a sampling cycle indicative of the intensity of light incident on one or more pixels of the array. This signal may be transmitted to the controller 12 and used by the controller to determine refractive index $n_2$ of the solution 133 being monitored.

Figure 8:
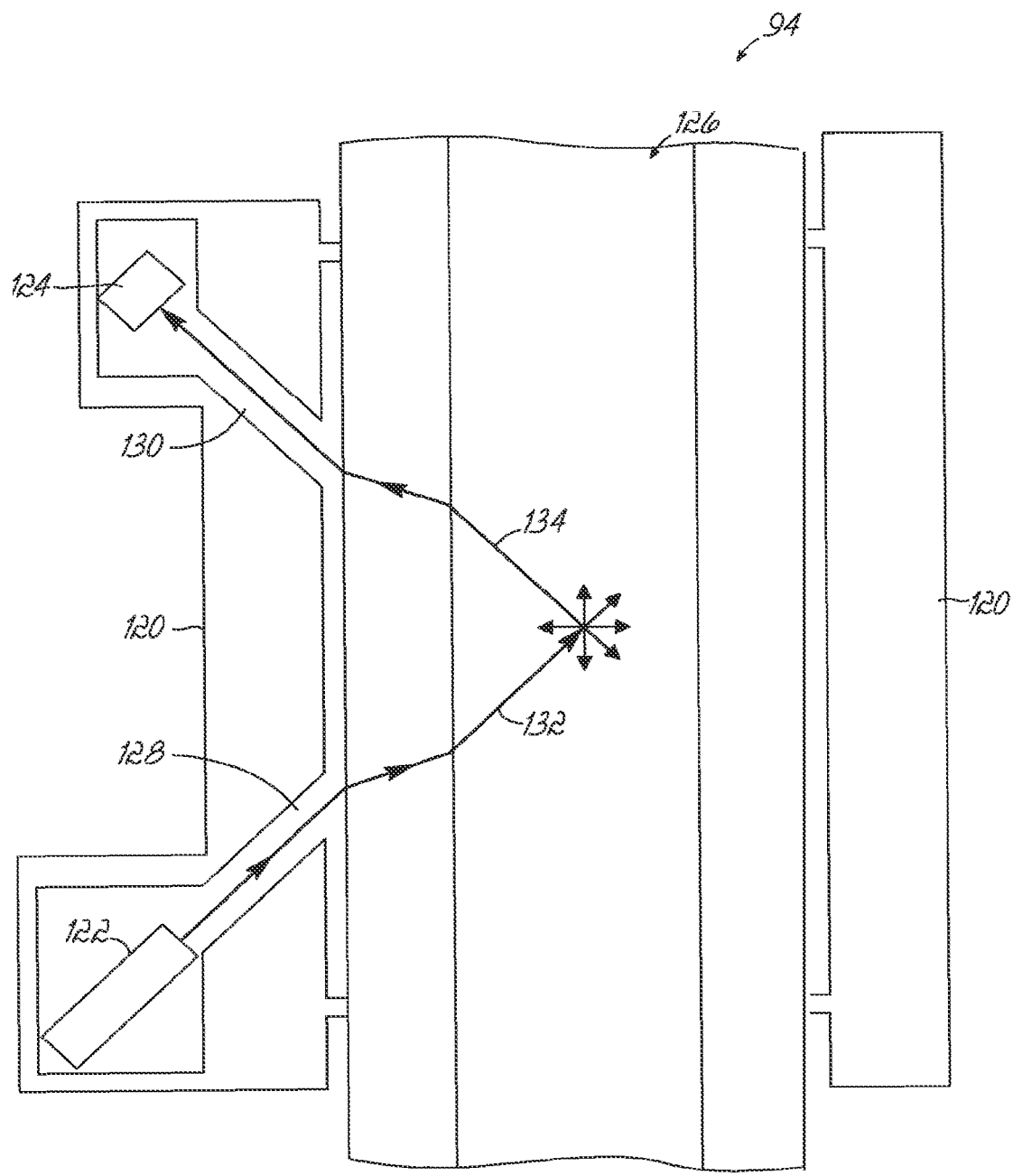
FIG. 8 is a diagrammatic view of yet another optical probe that may be used to implement the concentration sensor of FIG. 1.
Figure 9:
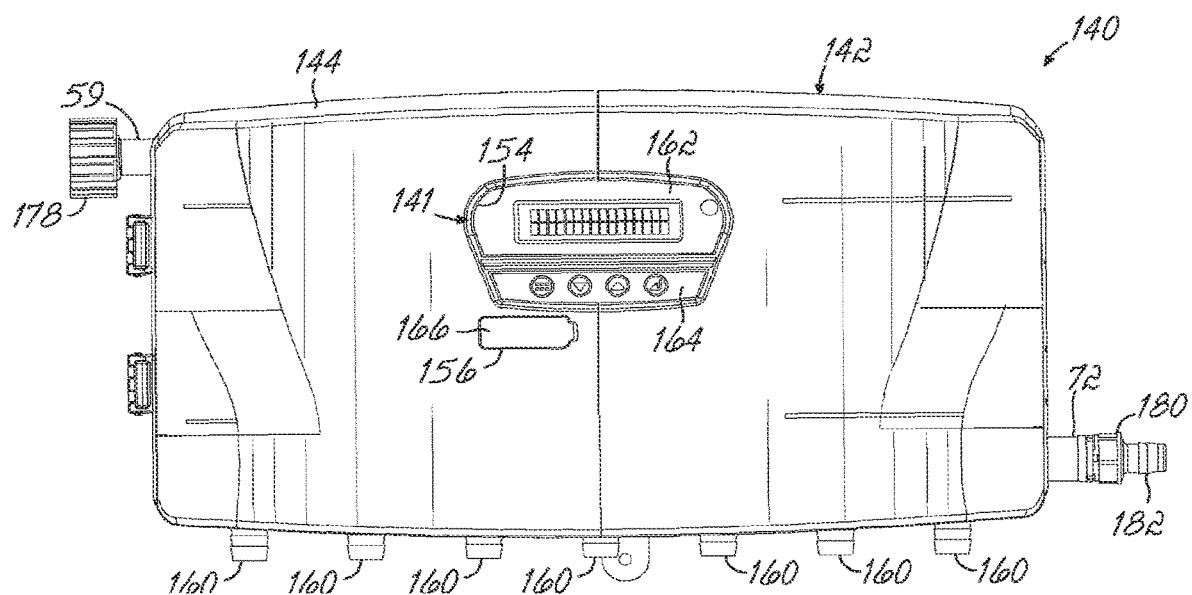
FIG. 9 is a front view of a dispenser in accordance with an embodiment of the invention.

FIG. 8 depicts an alternative embodiment of the optical probe 94 that is configured to detect minerals and/or other substances that fluoresce when exposed to short wavelength light, e.g., Ultra-Violet (UV) light. The optical probe 94 may include a holder 120, an exciting light source 122, and a photodetector 124. The holder 120 may be configured to locate the light source 122 and photodetector 124 in a fixed position (e.g., a distance and angle) relative to each other and a chamber 126 which the solution being measured flows through or otherwise enters. The holder 120 may include channels 128, 130 that provide an optical path for a beam of light 132 emitted by the light source 122, and fluorescent light 134 emitted by substances in response to being excited by the beam of light 132.

The chamber 126 may include one or more walls 136 that isolate the other components of the optical probe 94 from the medium in the chamber 126. The optical probe 94 may be configured to detect concentrations of substances in the diluent 60 based on the amount of fluorescent light 134 that is detected by the photodetector 124. The optical probe 94 may thereby enable the controller 12 to determine the concentration of substances, such as minerals that contribute to water hardness, which may have a direct effect on the cleaning capability of the solution and the amounts of chemicals that should be dispensed into the diluent 60.

However configured, the optical probe 94 may be used by the controller 12 to determine an equivalent part-per-million level of minerals in the diluent 60. This feedback to the controller 12 on the quality of the diluent may allow the controller 12 to adjust the amount of chemicals dispensed, e.g., dispensing additional chemicals to compensate for a diluent 60 having a high mineral content, and/or dispensing less chemicals if the diluent 60 has a low mineral content. This compensation for the mineral content of the diluent 60 may be performed, for example, in a laundry application to which the prescribed amount of detergent is based on the size and type of the laundry load and that assumes the dosing amount is correct based on a certain water hardness level.

Figure 13:
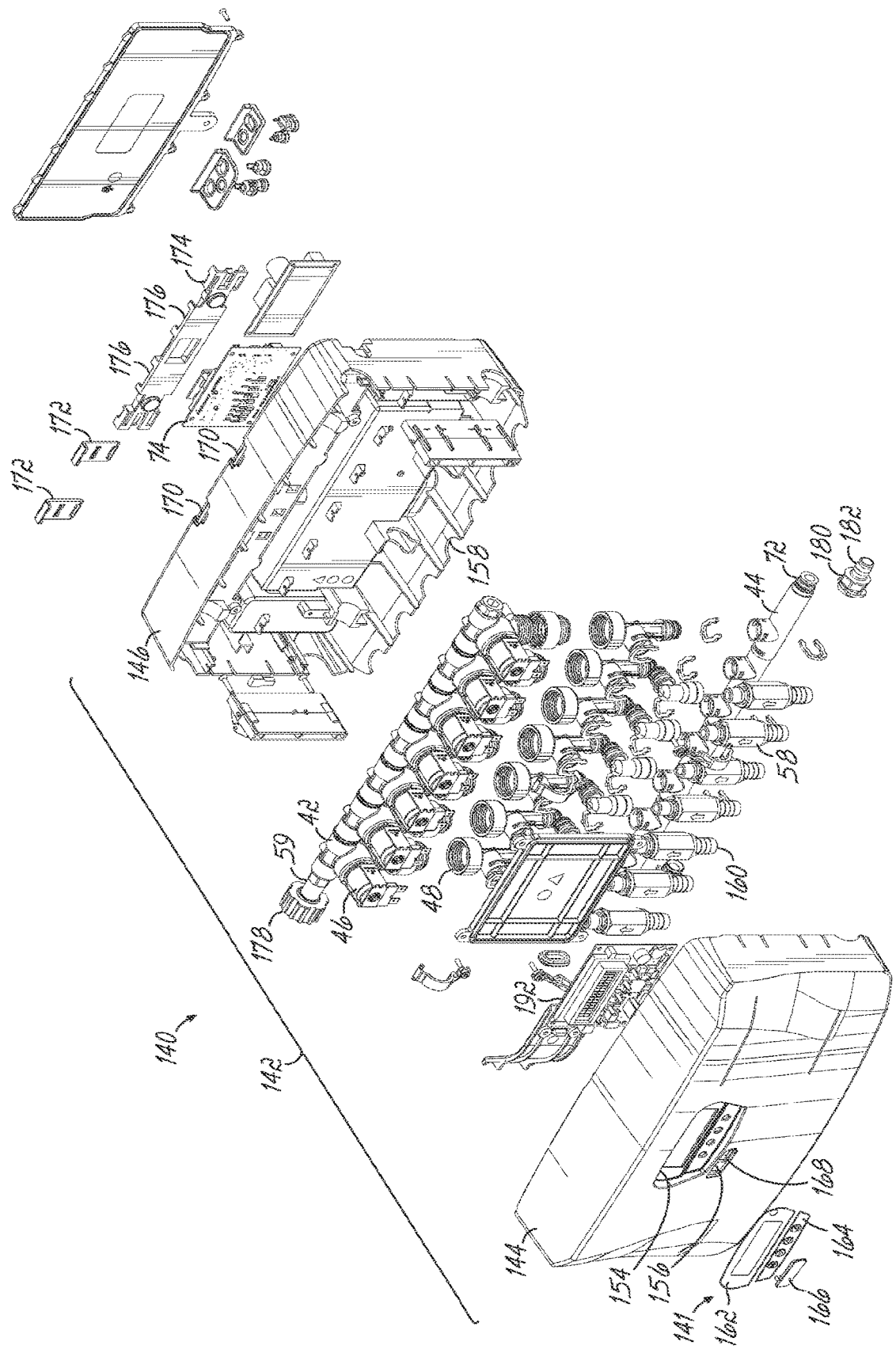
FIG. 13 is an exploded perspective view of the dispenser of FIG. 9.

FIGS. 9-13 depict front, bottom, back, perspective, and exploded views, respectively of a dispenser 140 in accordance with an embodiment of the invention. As best shown by FIG. 13, the dispenser 140 includes the inlet manifold 42, flush manifold 44, selector valves 46, eductors 48, check valves 58, and interface circuit 74. The dispenser 140 further includes a user interface 141 (which may be provided by the HMI 26 of controller 12) and a housing 142 having a front portion 144 and a back portion 146.

The front portion 144 of housing 142 may include openings 154, 156 that provide access to the user interface 141, and the back portion 146 of housing 142 may include openings 158 that provide access to input ports 160 of check valves 58. Opening 154 may provide access to a display 162 that displays information about the operation of the dispenser 140 to the user, and one or more input devices 164 (e.g., buttons) that enable the user to provide data/instructions to the dispenser 140. Opening 156 may include a removeable cover 166 that provides access to a serial data port 168, such as a Universal Serial Bus (USB) port, which is an industry standard communication protocol managed by the USB Implementers Forum. Dispensing Systems including USB ports are described in U.S. Pat. No. 8,956,579, issued Feb. 17, 2015, the disclosure of which is incorporated by reference herein in its entirety.

The back portion 146 of housing 142 may include one or more openings 170 each configured to receive a keeper 172. A mounting bracket 174 may be configured to be mounted to a wall or other support structure, and may include one or more slots 176 each configured to receive one of the keepers 172. In operation, the mounting bracket 174 may be affixed to the support structure, and the back portion 146 of housing 142 positioned over the mounting bracket 174. One of the keepers 172 may then be inserted through each opening 170 to engage a respective slot 176 of the mounting bracket 174. The back portion 146 of housing 142 may thereby be removably mounted to the support structure by securing it to the bracket 174.

The input port 59 of inlet manifold 42 may include a threaded connector 178 configured to receive a threaded end of a diluent supply line. The output port 72 of flush manifold 44 may include a nozzle 180 configured to receive the dispense line 17 that conveys the output of the dispensing system 10 to the point of use. The nozzle 180 may include one or more circumferential barbs 182 configured to resist movement of the supply line and provide a secure fluid-tight connection between the nozzle 180 and the supply line.

Figure 14:
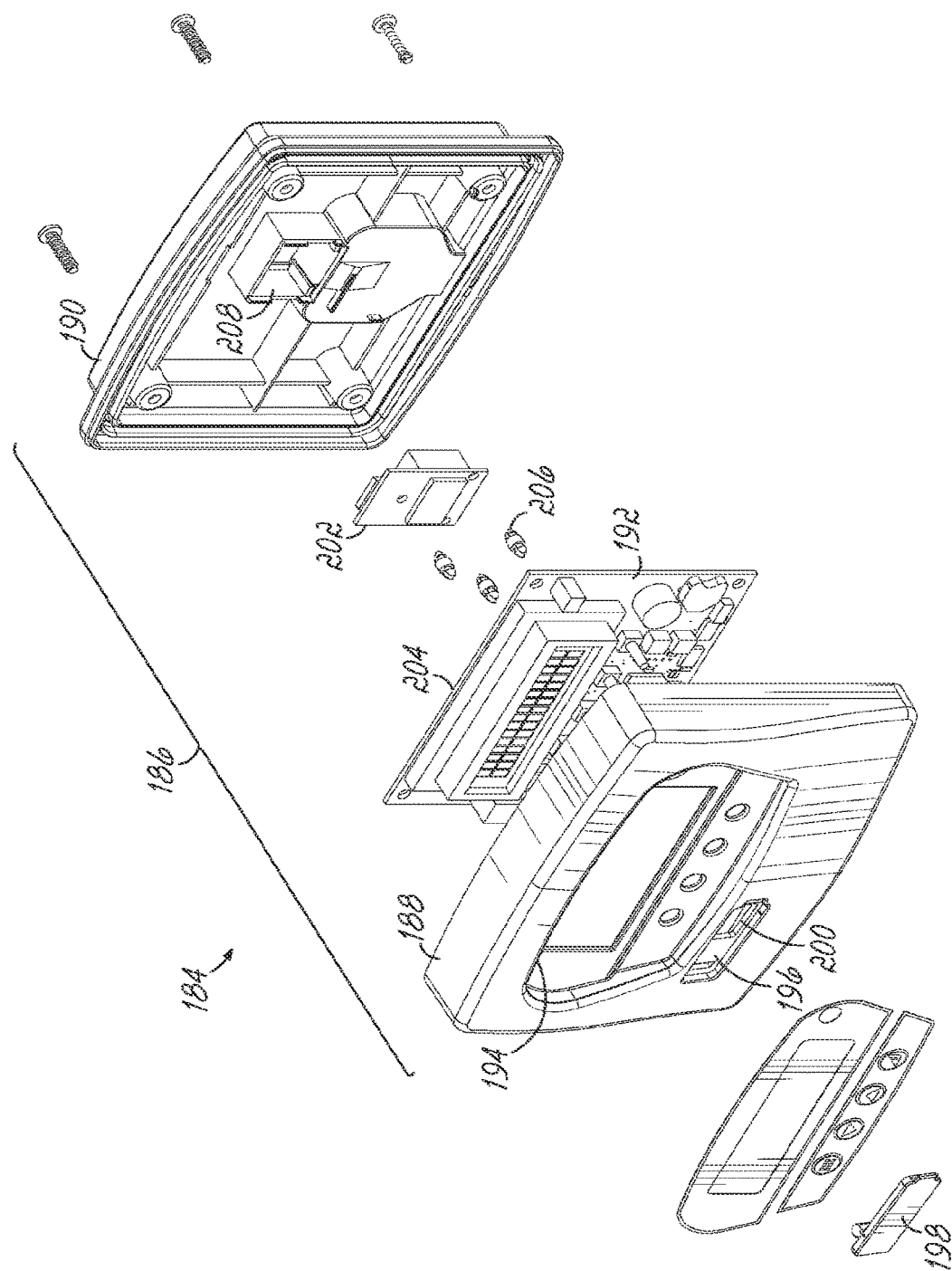
FIG. 14 is an exploded perspective view of a controller in accordance with an embodiment of the invention.

FIG. 14 is an exploded view depicting an exemplary embodiment of the controller 12. The controller 12 may include a housing 186 having a front portion 188 and a back portion 190, and a Printed Circuit Board (PCB) 192. The PCB 192 may include the HMI 26, processor 28, I/O interface 30, and memory 32 of controller 12. The front portion 188 of housing 186 may include an opening 194 that provides access to the HMI 26, and an opening 196 having a removable cover 198 that provides access to a serial data port 200, such as a USB port. A connector 202 may be affixed to a back facing side 204 of PCB 192 by one or more fasteners 206. The back portion 190 of housing 186 may include an opening 208 configured to receive the connector 202. The opening 208 may enable the I/O interface 30 of PCB 192 to be electrically coupled to the dispenser 140, for example, by plugging a connectorized multi-conductor cable into the connector 202.

It has been determined that during operation of a dispensing system that uses eductors, there are operational scenarios in which two different chemicals can mix within an eductor. The chemicals dispensed by an eductor are typically diluted at a diluent to chemical product ratio of between 2.5:1 and 4.0:1. In some cases, different chemicals may react with each other, thereby creating a thick congealed plug. This plug may then block the eductor so that little or no chemical is injected into the flow of diluent. Embodiments of the invention may solve this problem by adding a check valve between the flush manifold and the discharge port of the eductor.

Figure 15:
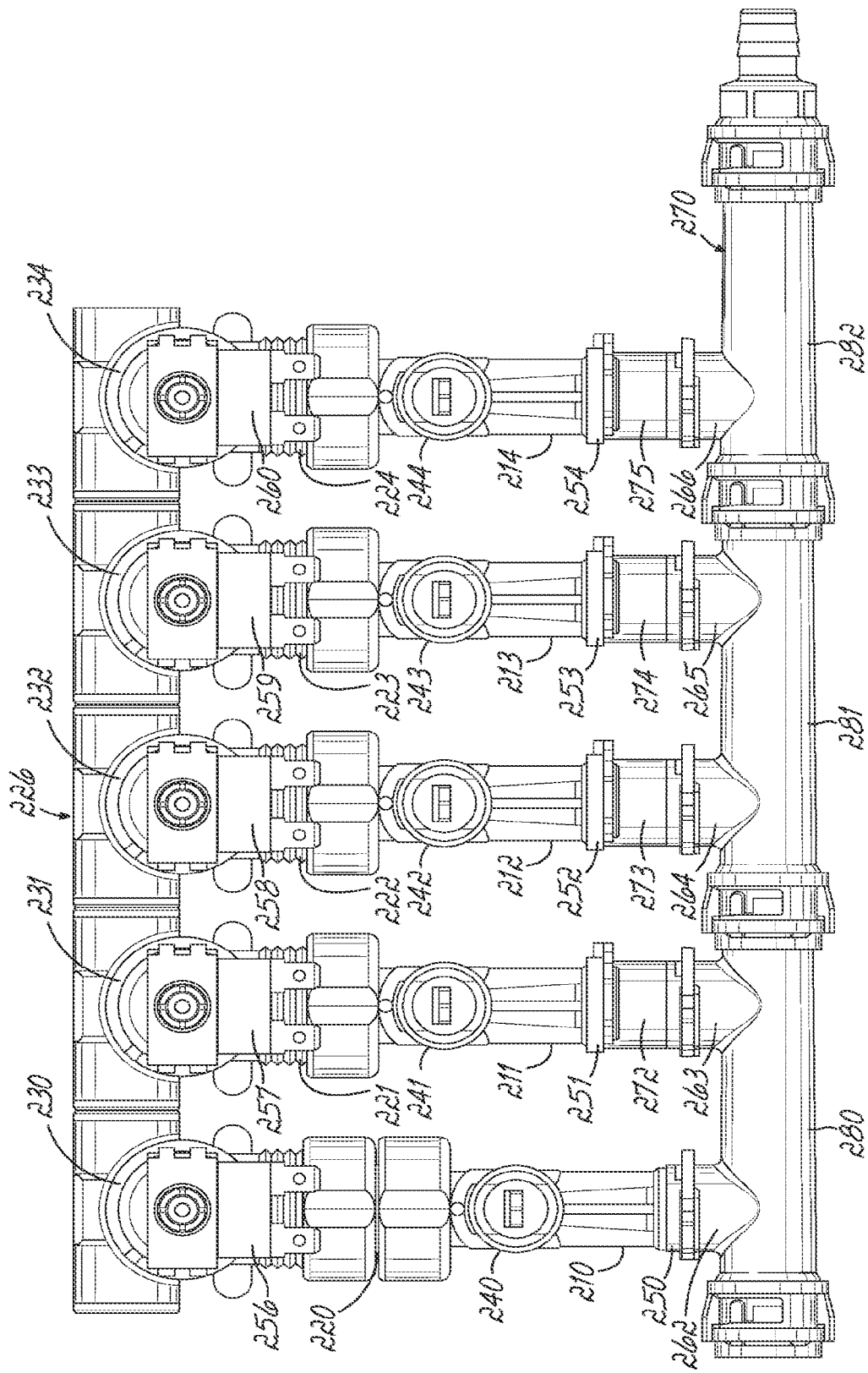
FIG. 15 is a front view of a portion of a dispenser in accordance with an embodiment of the invention that includes check valves which couple a plurality of eductors to a flush manifold.

FIG. 15 depicts a portion of a dispensing system in accordance with an embodiment of the invention that includes a plurality of eductors 210-214 each having an inlet port 220-224 coupled to an inlet manifold 226 by a respective selector valve 230-234, a pickup port 240-244, and a discharge port 250-254. Each of the selector valves 230-234 may include a solenoid 256-260 configured to open or close the selector valve 230-234 in response to signals from the controller. In the exemplary embodiment depicted, the discharge port 250 of eductor 210 is coupled directly to an intake port 262 of a flush manifold 270, and the discharge ports 251-254 of the remaining eductors 211-214 are coupled to the intake ports 263-266 of flush manifold 270 by check valves 272-275. The flush manifold 270 may comprise one or more modules 280-282 that are configured to be fluidically coupled to each other to form a flush manifold having a desired number of intake ports.

The leftmost or "upstream" eductor 210 may be configured as a flush eductor that is used to provide diluent from the inlet manifold 226 to the flush manifold 270 without injecting any chemical products. The controller may activate the selector valve 230 coupling the flush eductor 210 to the inlet manifold 226 to flush chemical solutions from the flush manifold 270. The flush eductor 210 may be a "high flow" eductor as compared to the other eductors 211-214 to shorten flush times, or may comprise a suitably sized conduit that lacks a venturi.

In operation, the controller may sequentially activate one or more of the selector valves 231-234 for various periods of time to inject a desired amount of one or more chemical products into the flush manifold 270. Once the mixture of chemicals defined by the dispensing application has been dispensed, the controller may open the selector valve 230 of flush eductor 210 to flush the flush manifold 270 with diluent for a period of time sufficient to flush each dispensed solution to the point of use.

By way of example, in a conventional dispensing system, two chemicals may come into contact as follows. The controller opens the selector valve of an eductor to dispense chemical A, which fills the flush manifold and the dispense line with a solution containing chemical A. After the correct amount of chemical A has been delivered to the flush manifold, the controller closes the selector valve. This may cause the pressure in the flush manifold to spike downward—and potentially go negative—as the momentum of the previously dispensed solution causes the solution to continue to flow through the dispense line, thereby pulling a vacuum on the flush manifold.

At this point, the controller may open the selector valve for the flush eductor, which pressurizes the flush manifold with diluent. Empirical data indicates that the pressure in the flush manifold may spike to approximately 0.33 bar in response to the controller flushing the flush manifold. This pressure may compress any air in the inactive eductors, thereby allowing any chemical solution remaining in the flush manifold to enter the eductors. This effect was determined experimentally using clear eductors in which a solution in the flush manifold was seen to rise to a level at which it occupied approximately 25% of the volume of the eductor. Unexpectedly, it has been further determined that the solution in the flush manifold rises to level in each eductor in proportion to the distance of the eductor from the last eductor used to dispense a chemical solution. Thus, the level rises the most in the eductor adjacent to the most recently activated eductor.

The phenomenon wherein the level rises in accordance to the distance from the most recently used eductor may be due to the last eductor used being relatively full of incompressible solution rather than compressible air as may be found in eductors that have had time to drain. The same phenomenon may occur when one chemical is dispensed immediately following another. In either case, the size of the pressure spike may also depend on the flow rate of the subsequent dispensing operation. Thus, activation of high flow eductors and/or flush eductors may generate higher pressure spikes in the flush manifold than low flow eductors. If the level of the dispense line rises above the level of the flush manifold at any point between the flush manifold and the point of use, this can also increase the pressure in the flush manifold as compared to dispense lines that remain below the flush manifold. In any case, when a selector valve opens, any solution present in the manifold may cause the pressure to increase as compared to when the flush manifold is empty and/or open to the atmosphere.

The check valves 272-275 may be configured to prevent solutions being dispensed by one or more of eductors 210-214 from back-flowing into the remaining inactive eductors as described above. This may prevent any of the chemicals dispensed by one eductor from entering one or more of the other eductors from the flush manifold 270. Advantageously, the check valves 272-275 may prevent different chemicals from coming into contact within the eductors 211-214 and plugging the venturi orifices thereof.

The check valves 272-275 may also provide a dynamic flood ring that keeps their respective eductor 211-214 in a constantly primed or "flooded" state by preventing solution from draining out of the eductor between activations. In addition, the check valves 272-275 may prevent air from entering the eductor and drying out any remaining chemical solutions, which could create residue inside the eductors 211-214. By independently varying the resistance provided to the flow of fluids through the eductor, the check valves 272-275 may provide more efficient operation than would be provided by fixed flood ring.

Still further, the check valves 272-275 may provide an additional benefit of creating a dynamic barrier that opens when the eductor 211-214 is activated and closes when the eductor 211-214 is idle to prevent contamination. Check valves 272-275 may be implemented as cartridges that can be added to existing systems as a separate part, or the check valves 272-275 may be integrated into the eductors 211-214 and/or flush manifold 270.

Figure 16:
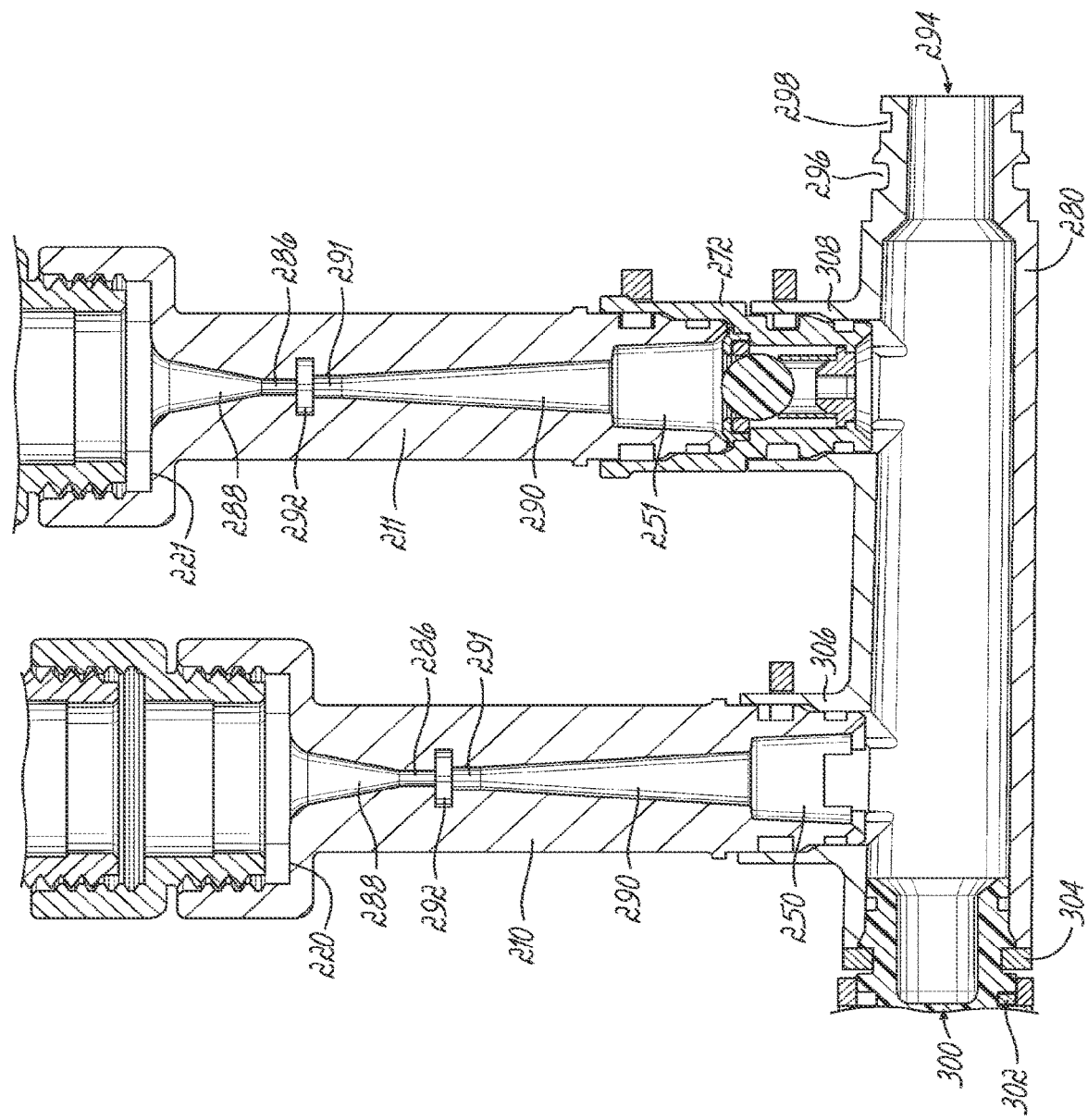
FIG. 16 is cross-sectional view of a portion of the dispenser in FIG. 15.

FIG. 16 is a cross-sectional view depicting additional details of the flush eductor 210, dispensing eductor 211, and module 280. Each eductor 210, 211 includes a venturi 286, a converging passage 288 that fluidically couples the venturi 286 to the inlet port 220, 221, a diverging passage 290 that includes a diffuser 291 and fluidically couples the venturi 286 to the discharge port 250-251, and a passage 292 that fluidically couples the venturi 286 to the pickup port 240, 241. The module 280 may include a tapered outlet 294 that includes one or more circumferential grooves 296, 298, a tapered inlet 300 including one or more flexible rings 302, 304, and one or more openings 306, 308 configured to receive the eductor 210, 211 and/or check valve 272. The tapered inlet 300 may be configured to receive and form a fluid-tight seal with the tapered outlet of another module. The flexible rings 302, 304 may be configured to engage the circumferential grooves of the received tapered outlet so that the received tapered outlet is held position with respect to the module receiving the outlet.

Figure 17:
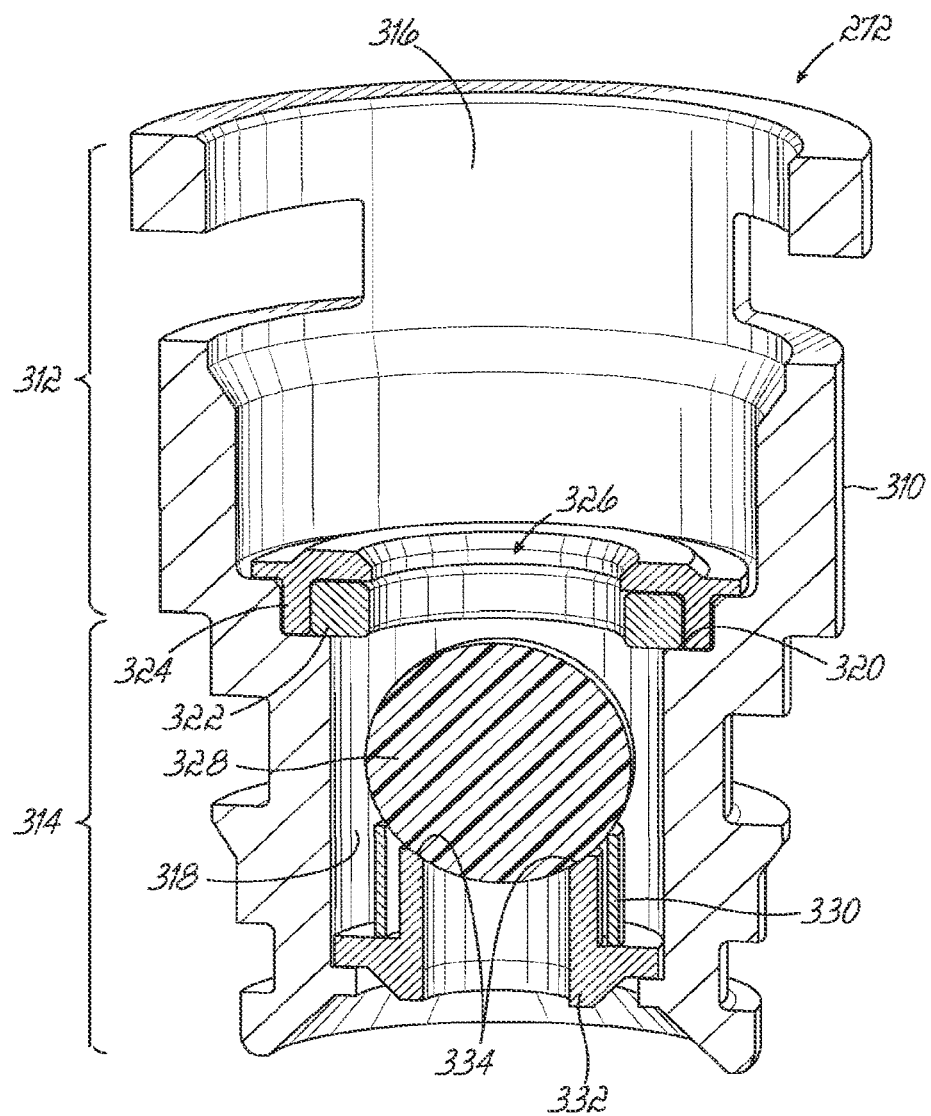
FIG. 17 is a cross-sectional view of one of the check valves of FIGS. 15 and 16.

FIG. 17 is a cross-sectional view depicting additional details of an exemplary embodiment of the check valve 272. The check valve 272 may include a barrel 310 having an upstream portion 312 configured to receive the discharge port 251 of eductor 211 and a downstream portion 314 configured to engage the opening 308 of module 280. The upstream portion 312 of barrel 310 may define an upstream chamber 316 and the downstream portion 314 of barrel 310 may define a downstream chamber 318. The inner surface of barrel 310 may include a shoulder 320 between the upstream and downstream chambers 316, 318 that provides support for a valve seat 322. The valve seat 322 may be held in place against the shoulder 320 by a valve seat retainer 324 and may define an opening 326 between the upstream and downstream chambers 316, 318. In an alternative embodiment of the invention, the shoulder 320 may be configured to define the opening 326, in which case the valve seat 322 and valve seat retainer 324 may be omitted.

A closing member 328 (e.g., a ball) may be urged into engagement with the opening 326 by an elastic member 330 (e.g., a spring). The elastic member 330 may be configured to maintain the closing member 328 in contact with the opening 326 when fluids are not being dispensed through the check valve 272, and to allow the closing member 328 to move away from the opening 326 when fluids are being dispensed through the check valve 272.

The eductor 211 may operate most efficiently when it is flooded, e.g., when the diffuser 291 is filled with solution. A flooded diffuser 291 may slow the velocity of the incoming diluent 60 as compared to a dry or empty diffuser, thereby ensuring a sufficient pressure drop across the eductor 211 to draw chemical product 18, 20 into the pickup port 241. By causing the closing member 338 to seal off the opening 326 when there is insufficient flow through the eductor 211, the elastic member 330 may enable the check valve 272 to operate as a dynamic flood ring that provides varying resistance to flow. The elastic member 330 may be held in place by a support 332 that includes a support surface 334. The support 332 may locate the elastic member 330 within the downstream chamber 318 of barrel 310. The support surface 334 of support 332 may be configured to hold the closing member 328 in a fixed open position when the flow of fluid through the eductor 211 exceeds a threshold value. The support surface 334 may thereby prevent damage to the elastic member 330 during dispensing operations. In the event air is present in the inlet manifold, the elastic member 330 may allow the air to flowing through the eductor 211 to open the check valve 272 slightly. The subsequent flow of liquid may then fully open the check valve 272 to provide maximum flow.

Adding check valves 272-275 between the dispensing eductors 211-214 and the flush manifold 270 may provide several advantages over conventional systems. For example, the check valves 272-275 provide a fluidic barrier between the dispensing eductors 211-214 and the flush manifold 270. This barrier may prevent mixing of dissimilar chemicals in the venturi 286, converging passage 288, diffuser 291, diverging passage 290, or any other portions of the eductors 211-214, thereby reducing the potential for clogging as described above. In addition, by preventing the diffuser 291 from drying out between chemical dispense stages and/or dispensing operations, the check valves 272-275 may prevent mineral salts and/or dissolved chemicals in the diluent from adhering to the inner surfaces of the eductors 211-214. Because further chemical products may adhere to these deposits, eventually building up and clogging the eductor 211-214, the check valves 272-275 may also reduce the potential for clogs due to the eductor 211-214 drying out between dispensing operations.

The dynamic flood ring feature of check valves 272-275 may improve the accuracy of dispensing processes by maintaining the eductor 211-214 in a wet state. When an eductor 211-214 is activated in a conventional dispensing system, there may be an initial period during which the eductor 211-214 does not generate suction at the pickup port 241-244. This failure to generate suction is believed to be due to a lack of liquid in the diffuser 291 at the beginning of the dispense stage. Thus, until enough diluent 60 has passed through the converging passage 288 to flood the diffuser 291, the eductor may fail to inject chemicals into the diluent 60. Depending on the design of the eductor 211-214, this flooding process can take 100 to 500 milliseconds. By isolating the diverging passage 290 from the flush manifold 280 when the eductor 211-214 is inactive, the check valve 272-275 may keep the diffuser 291 primed by preventing the chemical solution from draining out of the diverging passage after the selector valve 231-234 is deactivated. This may result in the diffuser 291 reaching a flooded state sooner after activation of the selector valve 231-234 than in dispensing systems lacking this feature. This in turn may result in the eductor 211-214 drawing chemicals and injecting them into the diluent sooner and more consistently than in conventional eductor-based dispensing systems.

The check valves 272-275 may also reduce leaks caused by positive pressure at the outlet 294 of the flush manifold 270. For example, in cases where the dispense line 17 is routed above the dispenser 14, there is a potential for the dispense line 17 to remain full of diluent 60 after flushing. Absent the check valves 272-275, if one of the check valves 58 coupling the feed line to the pickup port of an eductor is remove during a service call, the contents of the dispense line 17 may drain back into the eductor and spill onto the floor. This issue may be eliminated with the use of check valves 272-275. Additional advantages of the check valves 272-275 may include separation of pressure zones during flushing operations.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general-purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method of operating a chemical dispensing system using eductors, the method comprising:
    obtaining, from a pressure sensor positioned at a fluid inlet of the chemical dispensing system, a first signal indicative of a pressure of a diluent;
    determining, based at least in part on the pressure of the diluent and a desired dose of a chemical, a dispense duration that represents a duration of time to maintain a selector valve of the chemical dispensing system open in order to draw the desired dose of the chemical through an eductor at the pressure of the diluent;
    controlling operation of the selector valve to cause the selector valve to open, thereby, causing the diluent to flow through the eductor, wherein the eductor includes an inlet port into which the diluent flows, a pickup port configured to draw the chemical into the eductor in response to the diluent flowing through the eductor, a discharge port, and a venturi fluidically coupled to the inlet port, the discharge port, and the pickup port; and
    controlling operation of the selector valve to cause the selector valve to close after the selector valve has been opened for the dispense duration.

2. The method of claim 1, further comprising determining a volume the chemical dispensed during the dispense duration based on a flow rate of the diluent.

3. The method of claim 2, wherein the flow rate of the diluent is determined, at least in part, based on the pressure of the diluent.

4. The method of claim 1, further comprising:
    receiving a second signal from a second sensor positioned downstream of the discharge port of the eductor; and
    determining, based at least in part on the second signal, that a solution including the diluent and the chemical was dispensed from the chemical dispensing system.

5. The method of claim 4, wherein the second signal is indicative of a characteristic of the solution.

6. The method of claim 5, wherein the characteristic comprises at least one of: a flow rate, a conductivity, an index of refraction, or a fluorescent property.

7. The method of claim 4, further comprising:
    receiving a third signal from a third sensor positioned upstream of the inlet port of the eductor; and
    wherein determining that the solution including the diluent and the chemical was dispensed from the chemical dispensing system comprises determining, based on the second signal and the third signal, that the solution including the diluent and the chemical was dispensed from the chemical dispensing system.

8. The method of claim 1, further comprising determining, based at least in part on the pressure of the diluent, a flush duration that represents a duration of time to maintain a flush valve of the chemical dispensing system open during a flush stage.

9. The method of claim 1, further comprising:
    determining a volume of a chemical solution dispensed during the dispense duration, the chemical solution including the chemical mixed with the diluent; and
    determining, based at least in part on the pressure of the diluent and the volume of the chemical solution dispensed, a flush duration that represents a duration of time to maintain a flush valve of the chemical dispensing system open during a flush stage.

10. The method of claim 1, wherein determining the dispense duration comprises using a table that maps flow rate of the chemical through the pickup port of the eductor to diluent pressure, or wherein determining the dispense duration comprises calculating a flow rate of the chemical through the pickup port of the eductor based on the diluent pressure.

11. A dispensing system comprising:
    an inlet manifold including a plurality of outlet ports and an inlet configured to couple to a source of a diluent;
    a pressure sensor positioned to measure diluent pressure at an inlet end of the inlet manifold;
    a flush manifold including a plurality of intake ports;
    an eductor including an inlet port that is fluidically coupled to an outlet port of the inlet manifold, a pickup port fluidically coupled to a source of a chemical product, a discharge port fluidically coupled to an intake port of the flush manifold, and a venturi fluidically coupled to each of the inlet port, the pickup port, and the discharge port, the venturi being configured to draw the chemical product into the eductor in response to the diluent flowing through the inlet port such that the chemical product is mixed with the diluent to form a chemical solution;
    a selector valve coupled between the inlet manifold and the eductor; and
    a controller configured to perform operations comprising:
        obtaining, from the pressure sensor, a first signal indicative of a pressure of the diluent;
        determining, based at least in part on the pressure of the diluent and a desired dose of the chemical product, a dispense duration that represents a duration of time to maintain the selector valve open in order to draw the desired dose of the chemical through the eductor at the pressure of the diluent;

controlling operation of the selector valve to cause the selector valve to open, thereby, causing the diluent to flow through the eductor; and controlling operation of the selector valve to cause the selector valve to close after the selector valve has been opened for the dispense duration.

12. The dispensing system of claim 11, further comprising a second sensor positioned downstream of the discharge port of the eductor and configured to measure a characteristic of the chemical solution.

13. The dispensing system of claim 12, further comprising a third sensor positioned upstream of the eductor inlet port and configured to measure a characteristic of the diluent.

14. The dispensing system of claim 11, wherein the operations comprise determining a volume of the chemical dispensed during the dispense duration based on a flow rate of the diluent.

15. The dispensing system of claim 14, wherein the flow rate of the diluent is determined, at least in part, based on the pressure of the diluent.

16. The dispensing system of claim 12, wherein the operations comprise:

receiving a second signal from the second sensor; and determining, based at least in part on the second signal, that a solution including the diluent and the chemical was dispensed from the chemical dispensing system.

17. The dispensing system of claim 16, wherein the characteristic comprises at least one of: a flow rate, a conductivity, an index of refraction, or a fluorescent property.

18. The dispensing system of claim 13, wherein the operations comprise:

receiving a second signal from the second sensor;

receiving a third signal from the third sensor; and determining, based on the second signal and the third signal, that the solution including the diluent and the chemical was dispensed from the chemical dispensing system.

19. The dispensing system of claim 11, wherein the operations comprise determining, based at least in part on the pressure of the diluent, a flush duration that represents a duration of time to maintain a flush valve of the chemical dispensing system open during a flush stage.

20. The dispensing system of claim 11, wherein the operations comprise:

determining a volume of a chemical solution dispensed during the dispense duration, the chemical solution including the chemical mixed with the diluent; and determining, based at least in part on the pressure of the diluent and the volume of the chemical solution dispensed, a flush duration that represents a duration of time to maintain a flush valve of the chemical dispensing system open during a flush stage.

21. The dispensing system of claim 11, wherein determining the dispense duration comprises using a table that maps flow rate of the chemical through the pickup port of the eductor to diluent pressure.

22. The dispensing system of claim 11, wherein determining the dispense duration comprises calculating a flow rate of the chemical through the pickup port of the eductor based on the diluent pressure.

23. A non-transitory computer readable media comprising instructions that, when executed by one or more processors, causes the one or more processors to perform operations comprising:

obtaining, from a pressure sensor positioned at a fluid inlet of a chemical dispensing system, a first signal indicative of a pressure of a diluent;

determining, based at least in part on the pressure of the diluent and a desired dose of a chemical, a dispense duration that represents a duration of time to maintain a selector valve of the chemical dispensing system open in order to draw the desired dose of the chemical through an eductor at the pressure of the diluent;

controlling operation of the selector valve to cause the selector valve to open, thereby, causing the diluent to flow through the eductor, wherein the eductor includes an inlet port into which the diluent flows, a pickup port configured to draw the chemical into the eductor in response to the diluent flowing through the eductor, a discharge port, and a venturi fluidically coupled to the inlet port, the discharge port, and the pickup port; and controlling operation of the selector valve to cause the selector valve to close after the selector valve has been opened for the dispense duration.

* * * * *